Oct. 13, 1959
F. A. NICHOLSON
2,908,600
METHOD AND APPARATUS FOR FORMING LUMBER BOARDS
FROM VARYING LENGTHS OF SHORT WASTE UNITS
Filed Sept. 24, 1951
11 Sheets-Sheet 3
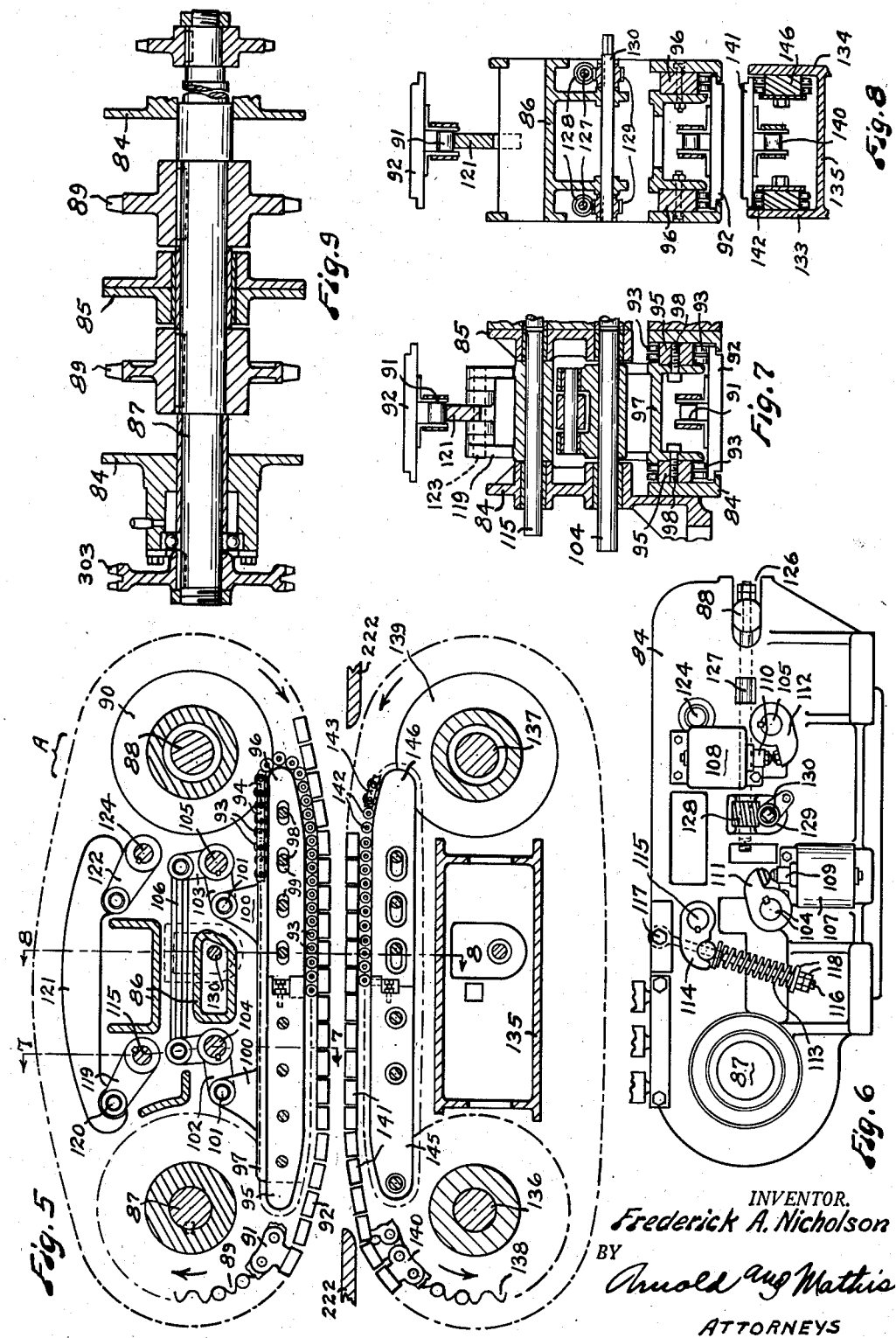
INVENTOR.
Frederick A. Nicholson
BY
Arnold aug Mathis
ATTORNEYS Oct. 13, 1959 F. A. NICHOLSON 2,908,600
METHOD AND APPARATUS FOR FORMING LUMBER BOARDS
FROM VARYING LENGTHS OF SHORT WASTE UNITS
Filed Sept. 24, 1951 11 Sheets-Sheet 4
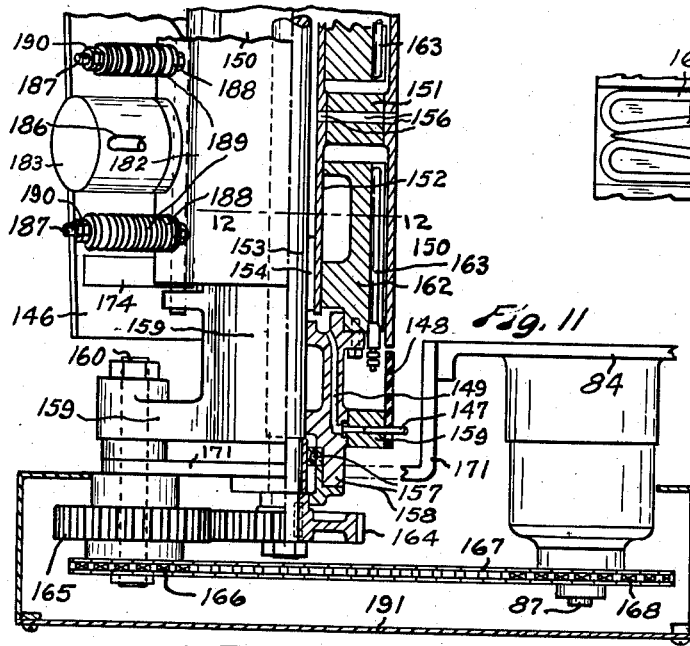
Fig. 11
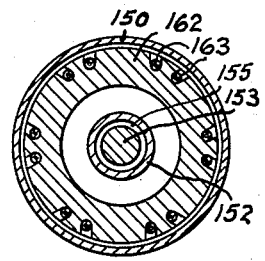
Fig. 13
Fig. 12
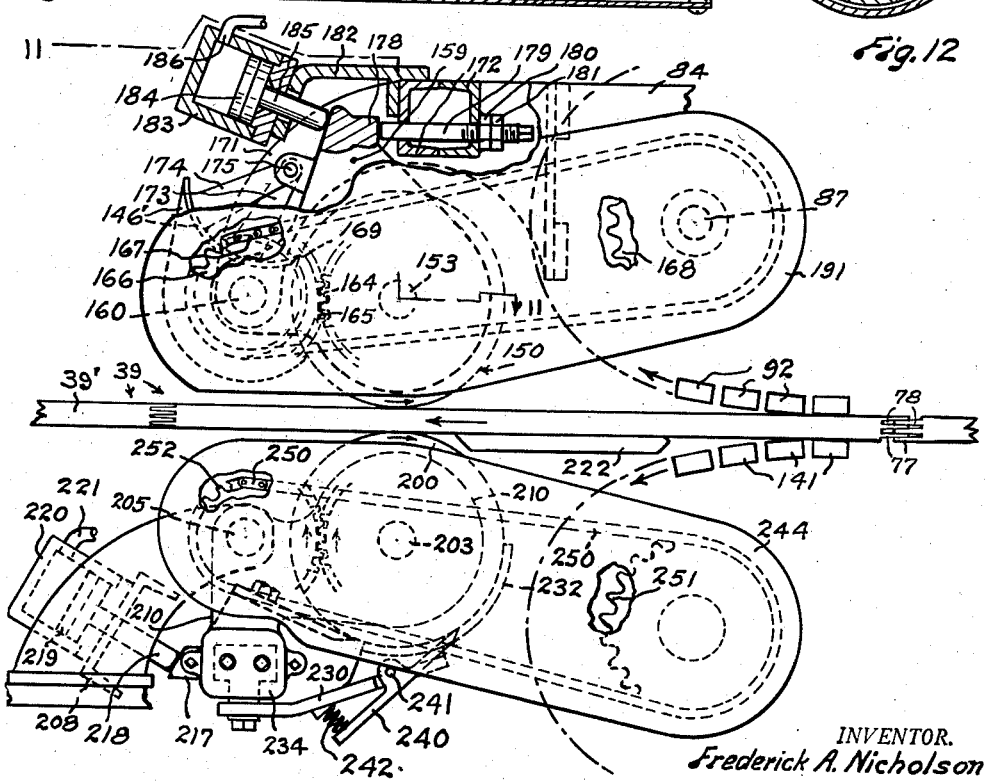
Fig. 10
INVENTOR.
Frederick A. Nicholson
BY
Arnold & Mathis
ATTORNEYS

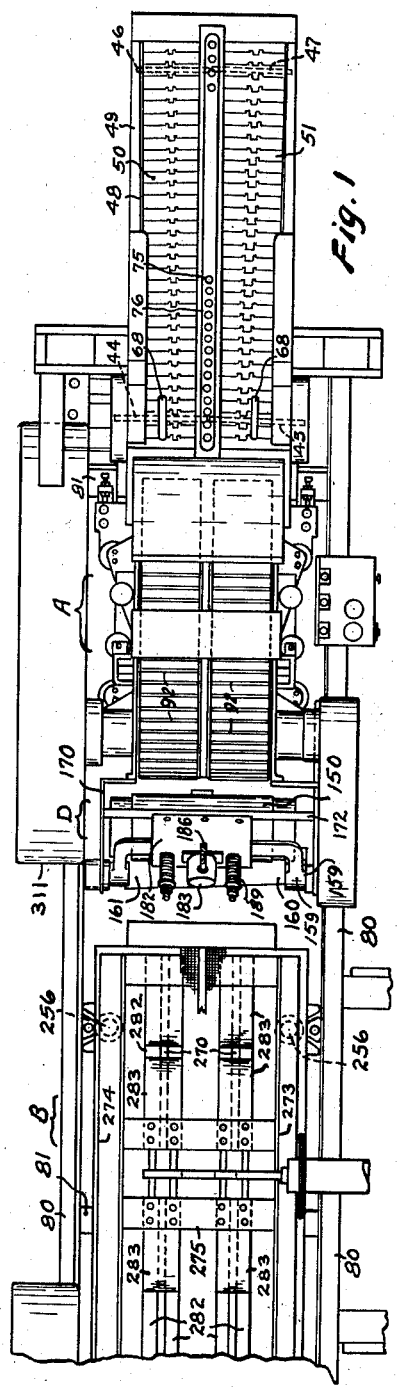
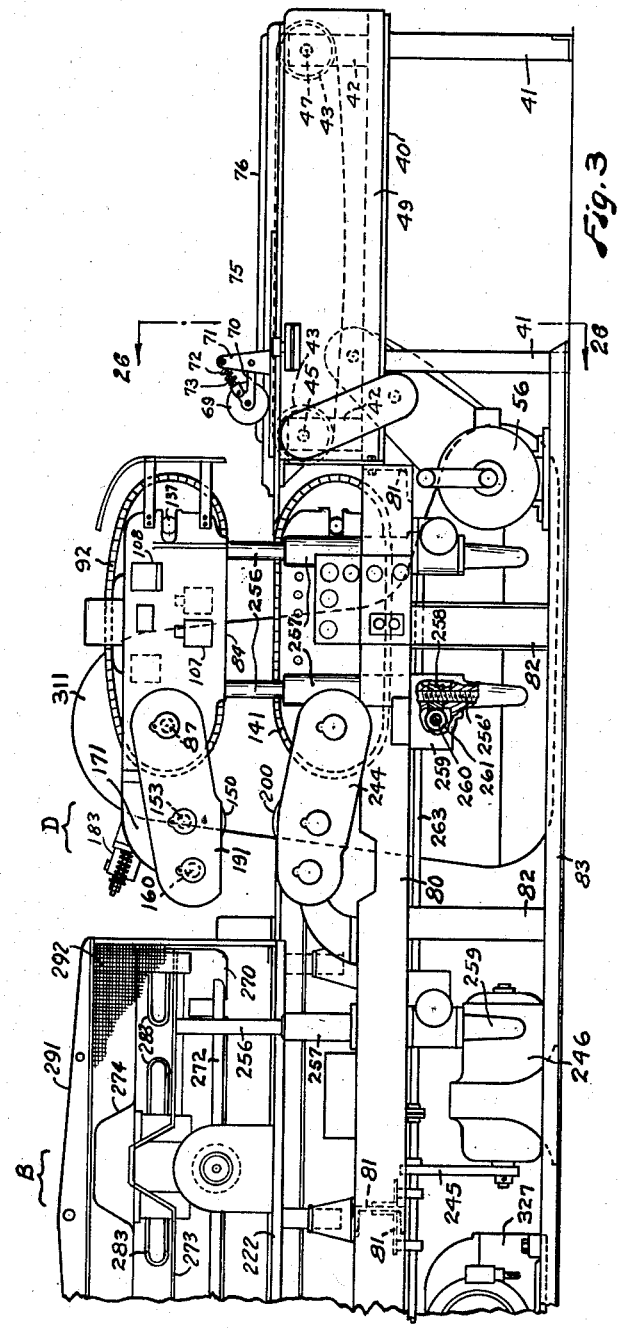

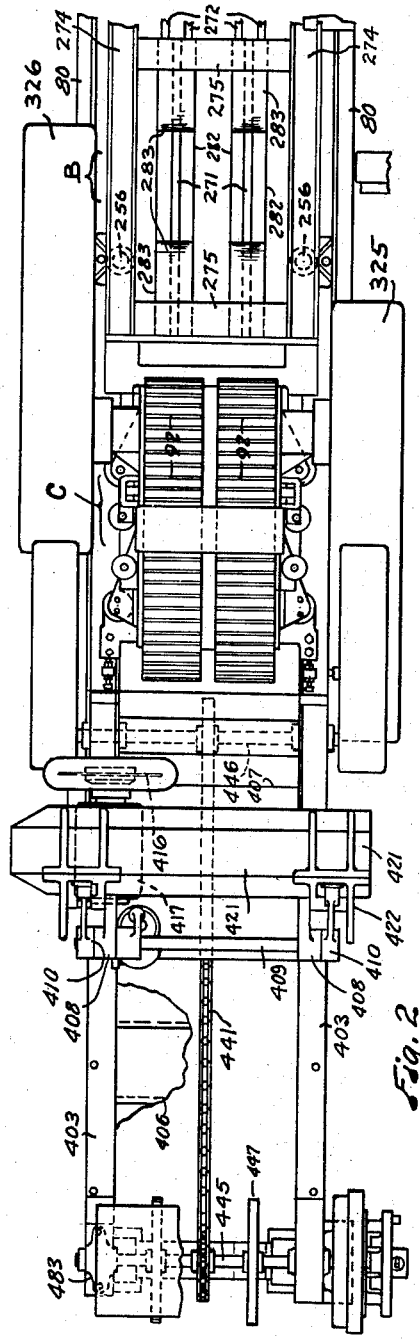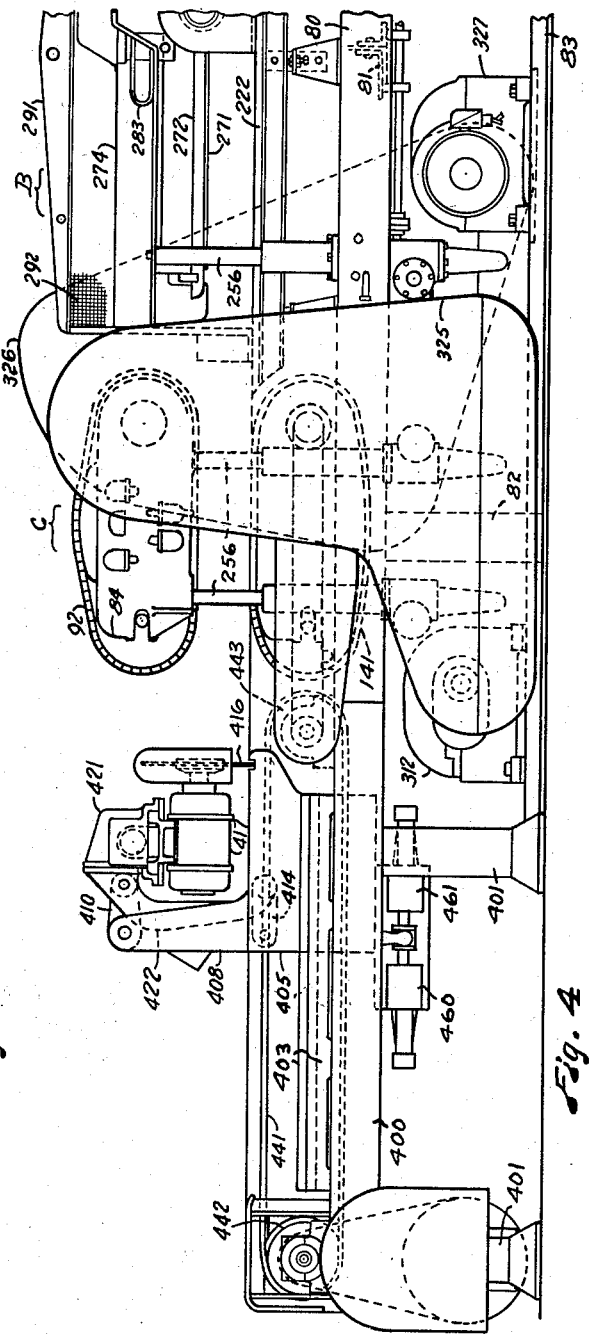

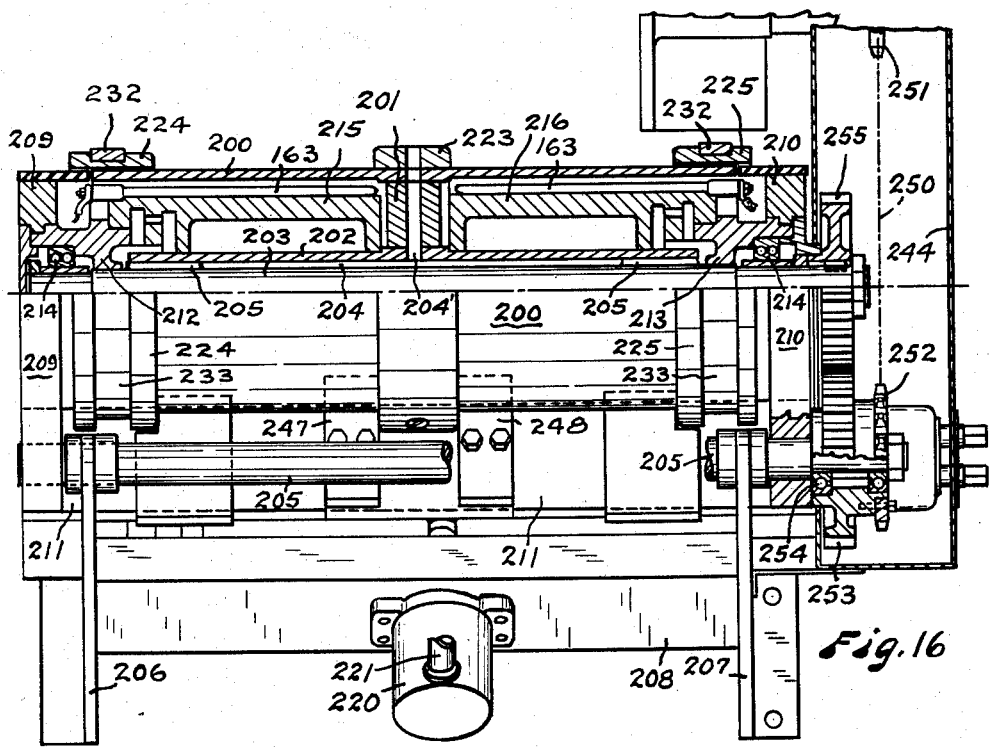
Fig. 16
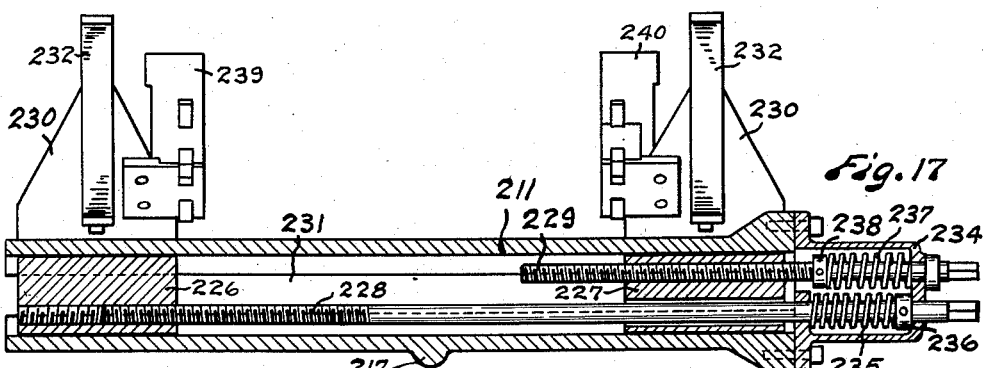
Fig. 17
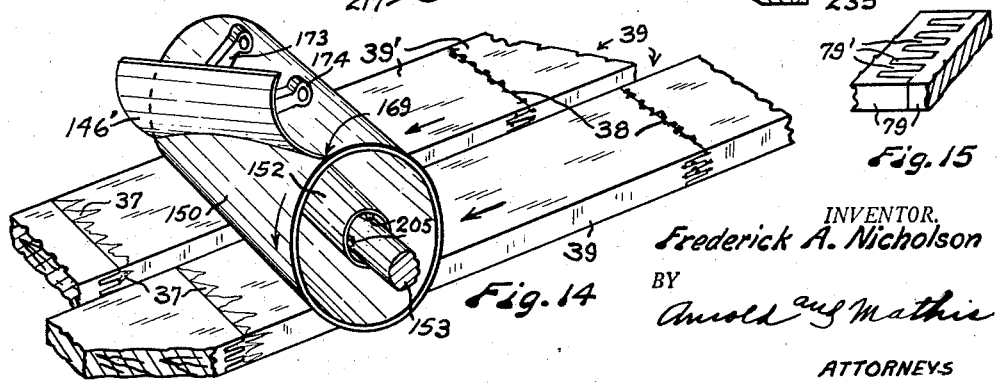
Fig. 14
Fig. 15
INVENTOR.
Frederick A. Nicholson
BY
Arnold and Mathis
ATTORNEYS

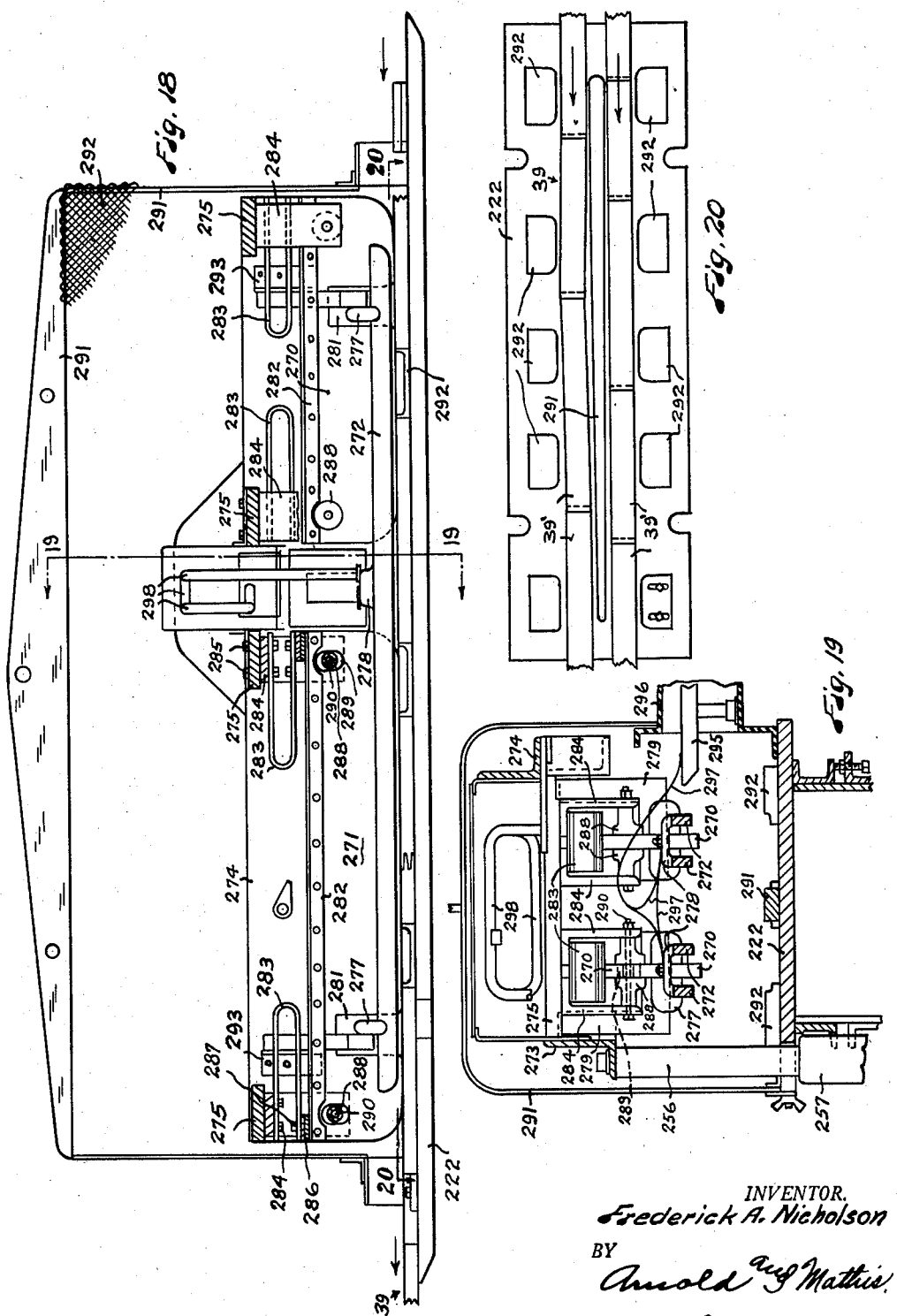

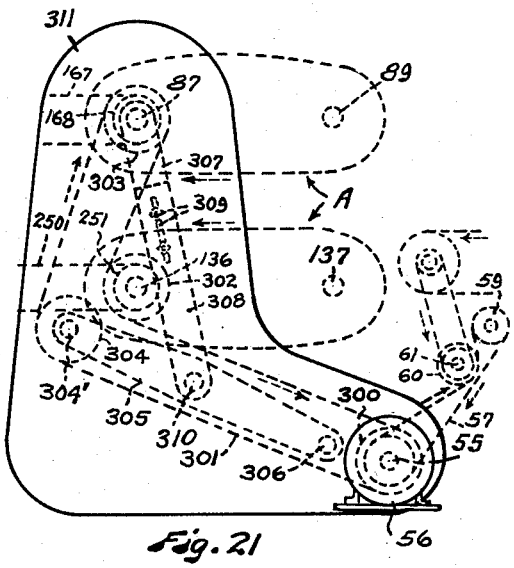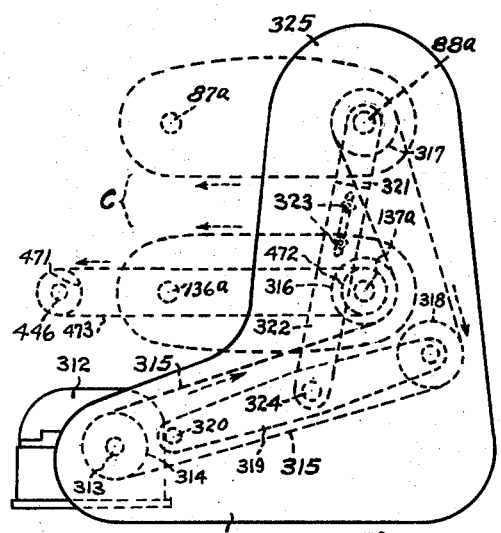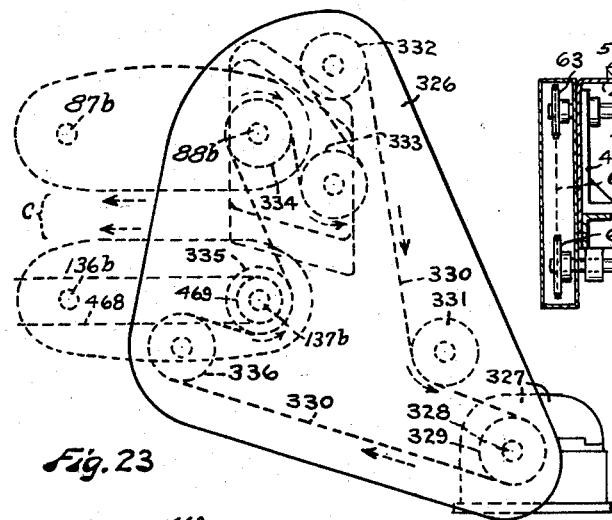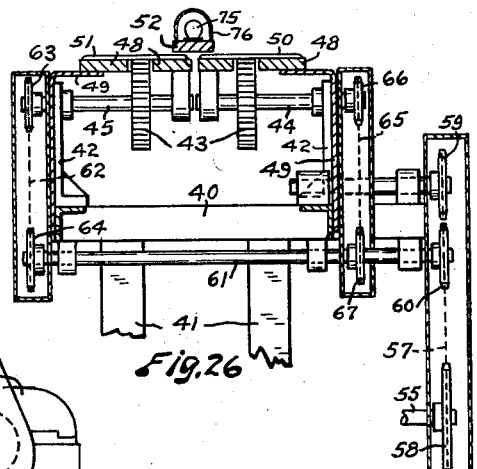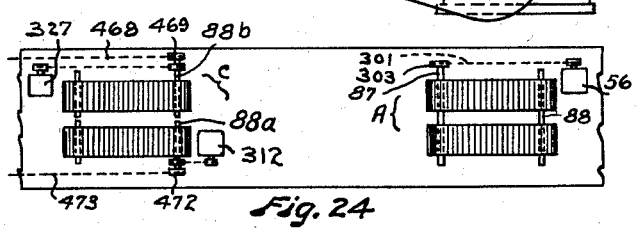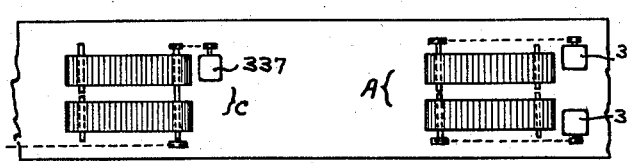

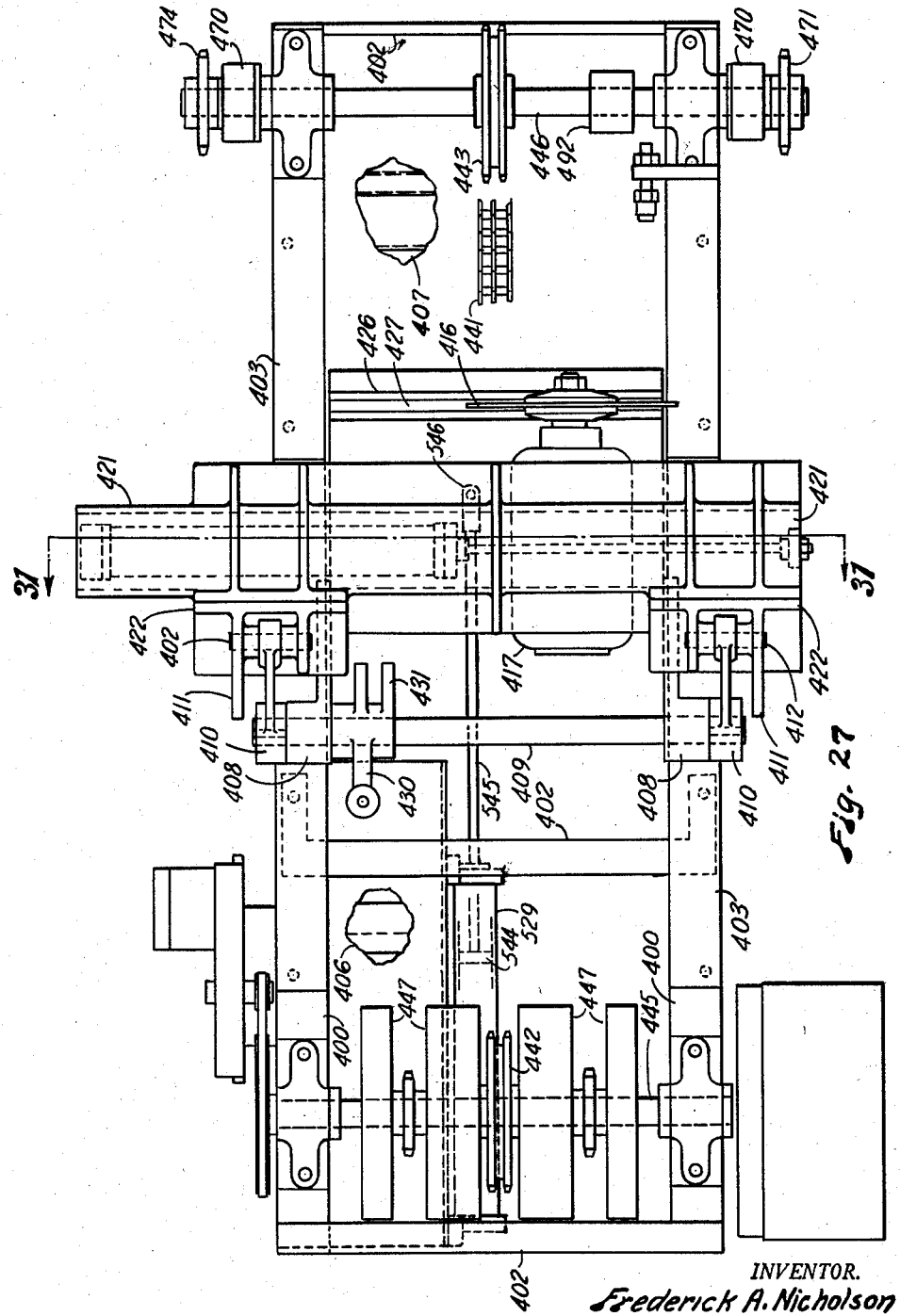

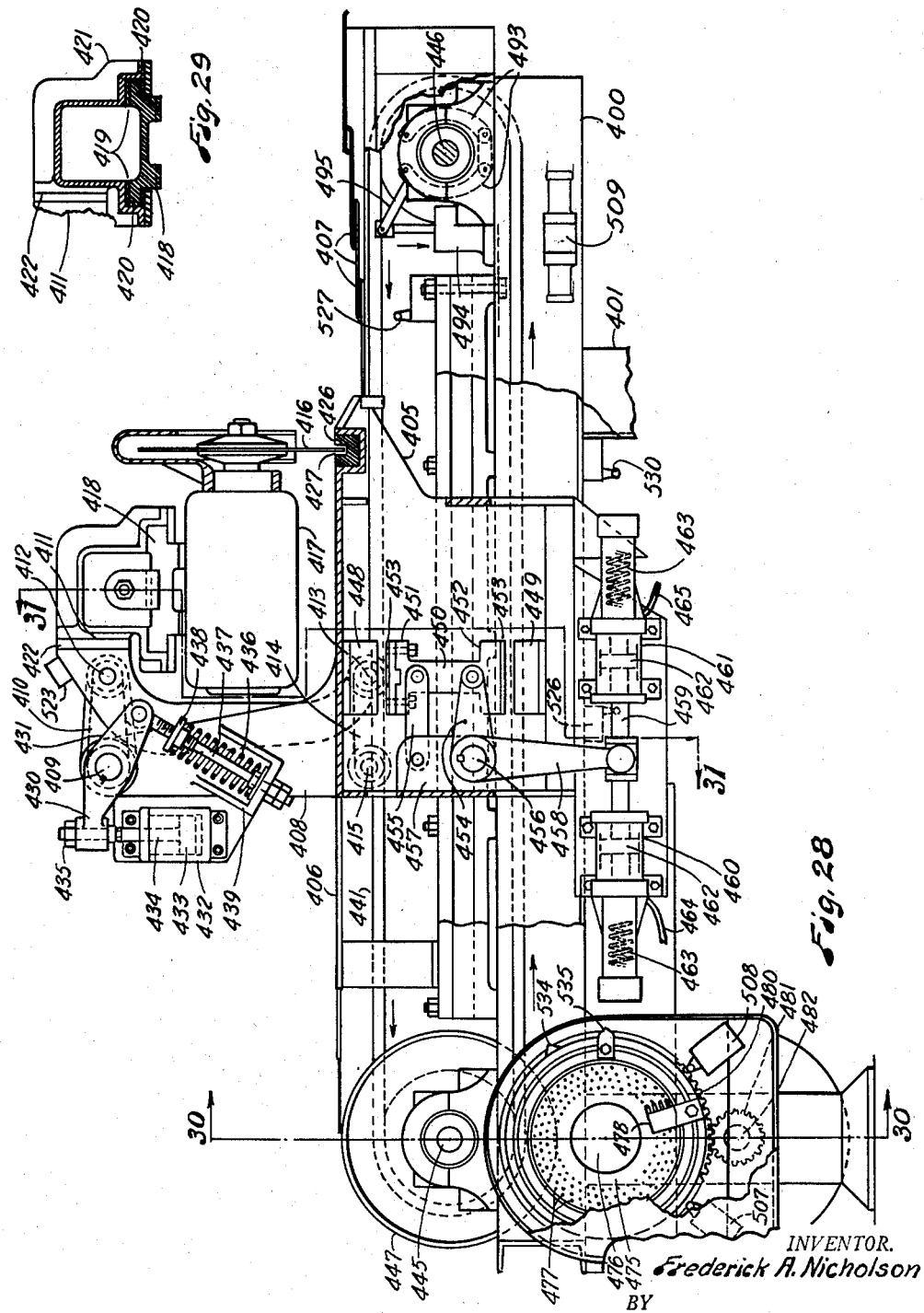

Oct. 13, 1959   F. A. NICHOLSON   2,908,600
METHOD AND APPARATUS FOR FORMING LUMBER BOARDS
FROM VARYING LENGTHS OF SHORT WASTE UNITS
Filed Sept. 24, 1951   11 Sheets-Sheet 10
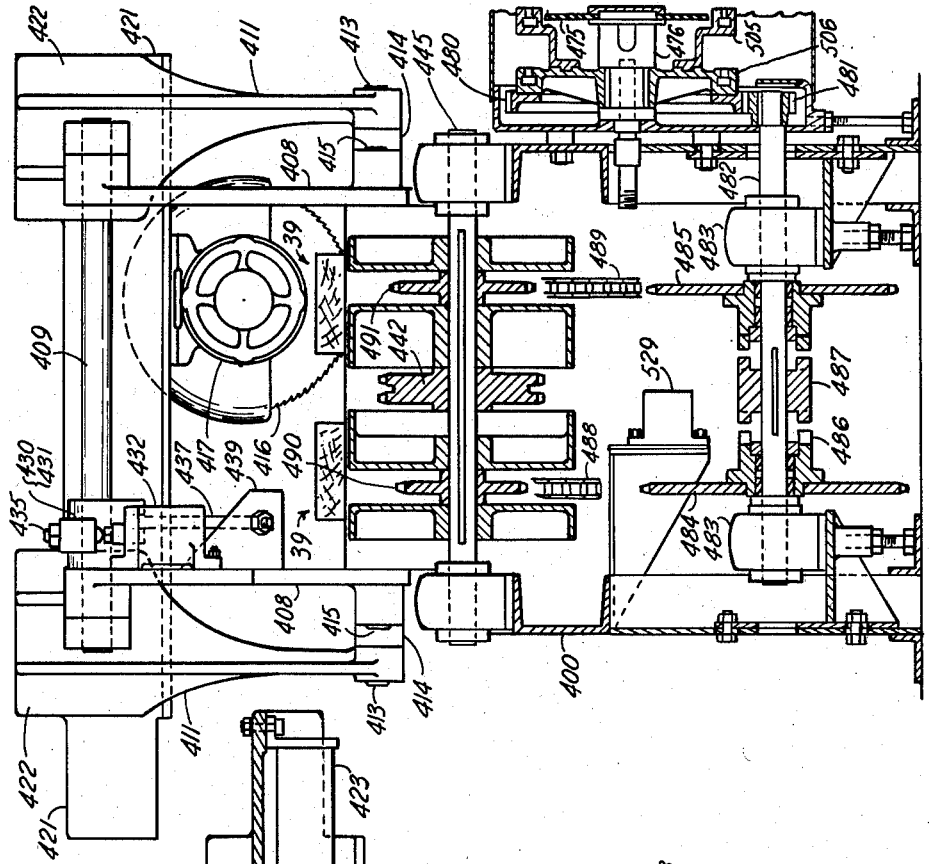
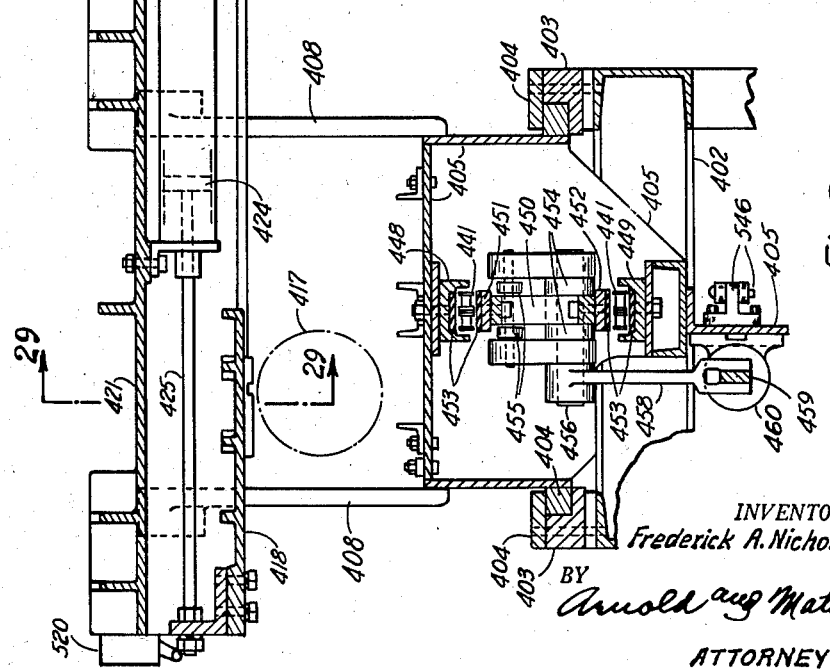
INVENTOR.
Frederick A. Nicholson
BY
Arnold and Mathis
ATTORNEY

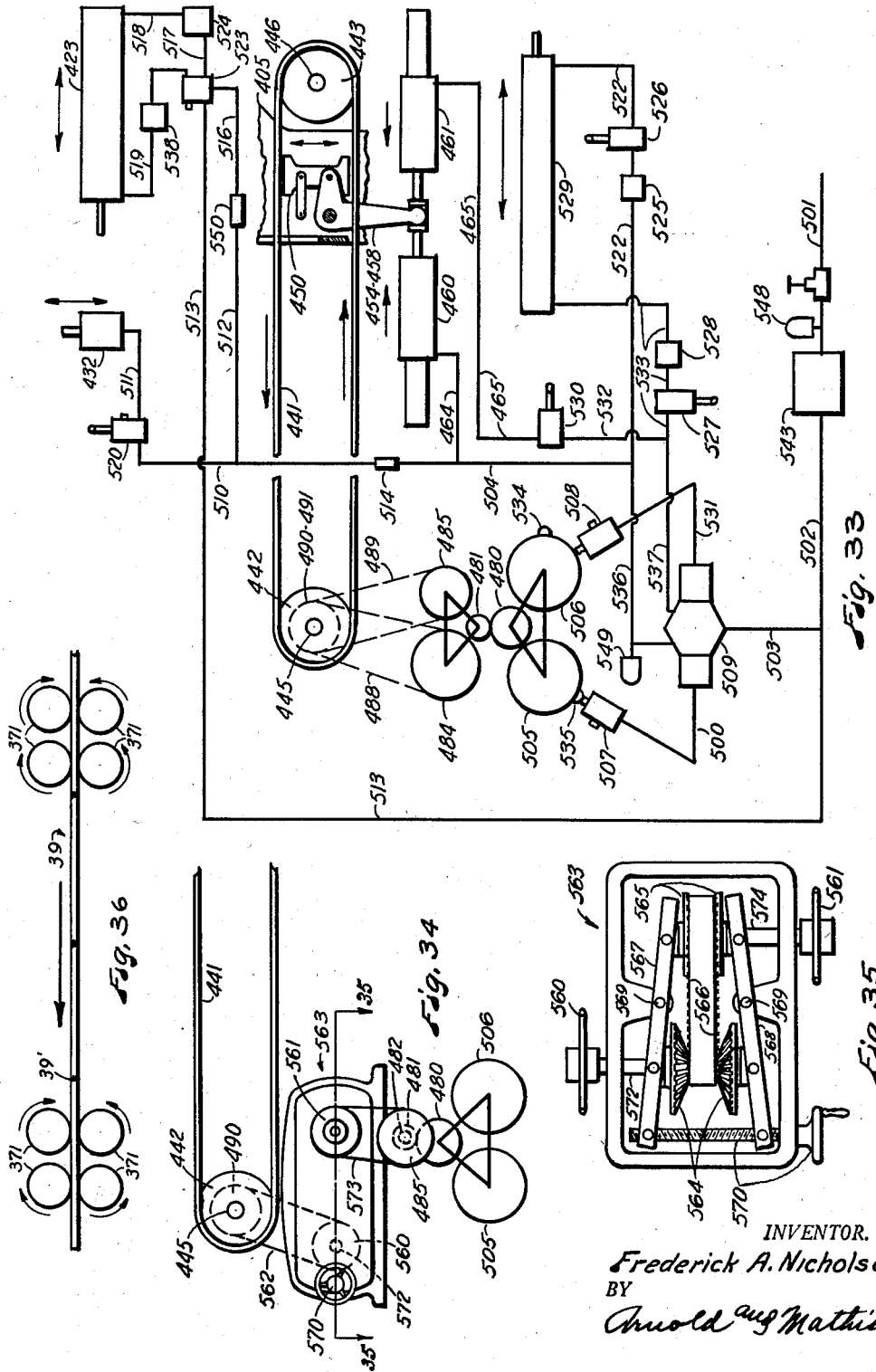

United States Patent Office 2,908,600
Patented Oct. 13, 1959

2,908,600

METHOD AND APPARATUS FOR FORMING LUMBER BOARDS FROM VARYING LENGTHS OF SHORT WASTE UNITS

Frederick A. Nicholson, Seattle, Wash.

Application September 24, 1951, Serial No. 247,988

27 Claims. (Cl. 154—116)

My invention relates to a method of forming commercially valuable lumber products in the form of boards or panels from relatively short and variable length units in continuous operation and to a mechanism for carrying out said method.

More particularly, my invention relates to a method of forming a board of commercially valuable length from relatively short waste units of varying lengths by providing these with a matching end portion, as a tapered splicing finger, and pressing these together in end-to-end relation in a continuous operation either with or without glue on said fingers, and to a mechanism for carrying out said method.

In sawing lumber from the logs there is a great quantity of the lumber which has defects as knots, pitch pockets, decayed wood, worm holes, splits, cross grain, etc., in the same which render the product unsuitable for many purposes. Accordingly, these defects are removed by sawing out the same from that portion which is relatively free of said defects (extent depending on grade sought), and thereby there is formed great quantities of pieces or units of varying lengths too short for most practical purposes and yet said units are of good material. Such small pieces or units are practically unsalable and are sold for only inferior purposes at a very small price.

My invention provides an economical method of securing these short pieces together, even of different lengths, in one continuous piece of a commercial length and desired strength that renders the same merchantable and makes the same high-class construction material. By "continuous," I mean that the operation is without cyclic interruption or stop periods in the feeding and movement of the material through the machine; as for example, shutting down to periodically clean the glue setting mechanism of accumulated glue. Such "continuous" operation in forming an endless strip is to be contrasted with assembling individual pieces by batch or unit method.

Furthermore, by providing for making such short and irregular length pieces into suitable predetermined length boards, the same may be edge matched or jointed and edge glued to make a construction assembly of continuous wide width or panel, such as is suitable for use as in making cores for table tops, chair seats, and other useful construction or furniture members. The joints between the small units forming such boards may or may not be glued. When the joints are not glued, it will be understood, the small units with their tapered finger matched joints are held together by the friction caused by the pressure applied in forming the board.

Accordingly, one of the primary purposes of my invention is to provide a method and mechanism to carry out the same which will conserve one of our most important natural resources, viz., our forests. In short, my invention makes use of a product of a rapidly disappearing general natural source and makes a field for the utilization of lumber to convert such product into a highly commercial and utilizable product.

The difficulties involved in end-to-end gluing are many and these relate largely to the providing of a constant pressure at the glue joint. On the one hand, pressure on the glue joint is necessary while the glue is setting and on the other hand, the joint must not be disturbed, i.e., the pieces must not be moved relative each other, during the setting of the glue. To keep the joints of the many relatively small pieces in undisturbed relation and yet under pressure while being formed into a continuous strip of lumber in a continuous process is a primary object of my invention.

For the higher grades of lumber, it is a fundamental principle in making wood joints by gluing, that the wood material of each piece at the joint must be in close contact for best results and economy of glue. Therefore, I have provided end pressure sufficient to drive or press the fingers of the splice together and maintain pressure while the glue is setting or being cured or polymerized. As stated, the glue must be undisturbed while setting. In providing for this non-disturbance of the joint between the relatively short units during the setting of the glue, I have discovered that it is important to provide for the continuous strip of the units between the infeed and outfeed mechanisms while passing over the bed of the machine, to be relatively unrestricted as to transverse movement in the plane of the strip, i.e., relatively unrestricted by lateral guides in order to permit the joints to be squarely formed or closed.

Accordingly, the machine is provided with limited clearance edgewise for the continuous strip. In the vertical plane resilient shoes press the continuous strip thicknesswise down against the bed thereby letting the ends square through a lateral plane while the board is being restricted in the vertical or the thickness direction. It will be understood that it is only the occasional piece of lumber that will not have its longitudinal axis in line and where the lateral clearance is involved in providing for closing the joint. In 99% of the cases the continuous strip of lumber will come through with the closed joints and the longitudinal axis of all the pieces strictly in line. Also, this freedom for transverse adjustment to provide for the closing of the joint is important to avoid a jamming of the continuous strip and causing fracturing of the lumber.

In attempting to unite continuously in end-to-end relationship short pieces of lumber with matching end portions in registration to form a continuous strip, it is particularly difficult to maintain these in undisturbed aligned relationship while the glue is setting and at the same time have the lumber of a commercial length, because the setting of the glue must be accomplished while the assembly is under longitudinally directed movement and pressure. Even though the units are traveling through the machine and even though the units must be subjected to and held together by a substantially uniform and predetermined resistance to the feeding force or longitudinally directed pressure, it is positively necessary that while the glue on the matched end portions of the units is being set that there be no disturbance of the joint. Feeding of the units through the machine with constant pressure at the joint while the glue is being set, requires that while said joint is under pressure, means be provided to minimize the tendency of the pieces to buckle under the feeding pressure and thereby disturb the glue at the moment of setting. The units tend to react much as a strip of blocks under longitudinally directed pressure as far as buckling is concerned. This tendency is particularly accentuated in a plane at right angles to the wide dimension of the lumber and it is a minimum in a plane parallel to the wide dimension.

Moreover, as exemplified in edge gluing practice, a great deal of difficulty has been encountered in undertaking to provide against starved joints. Accordingly, there is supplied an excess of glue which is exuded at the joints when said pressure is applied. This exuded glue causes great difficulties in trying to cure the same, i.e., to set the glue at the joint. When heating means are applied these tend to accumulate the glue on the heating means until finally the machine must be stopped and the accumulated dry glue must be removed. Such periodic or cyclic stopping of the equipment to clean out the gluing mechanism results in low and costly production. Thus, the pressure for the glue joints creates many problems.

One of my primary objects is to provide in end-to-end gluing of short units a constant controlled longitudinally directed pressure for the continuous lumber strip between the infeed and outfeed mechanisms and which will be so applied that it will not disturb the glue joint while being cured—all this in a continuous operation.

Furthermore, great difficulty has been encountered in edge gluing experience due to the fact that when high frequency electric currents are employed in setting the glue, currents develop in the masses of exuded glue which prevent uniformly passing of the current through the glue joint. This results in a non-uniformly treated glue joint, since the power is dissipated uselessly on the face of the stock. Furthermore, such short circuiting of the high frequency current causes arcing which results in scorching of the lumber face. Sometimes this takes the form of perforations of the lumber. In forming a board by end-to-end gluing, these difficulties have been overcome in my invention.

Furthermore, it is manifest that the short pieces of lumber should be so fed to the infeed mechanism that the end of the predetermined length of board shall be produced by a cut through the continuous lumber strip formed by the end splicing that will not have the saw cutting through a joint or even very close to a joint. When this cutting through the joint occurs, the board must be sorted out and re-cut to a desired dimension which will provide a cut clear of the joint by a considerable margin. Such wasting of stock after incurring all the expense to reach the board stage and added costs for sorting out and reserving must be avoided and such is an object of my invention. The locating of the cut for the end of a board of predetermined length during the time when the short pieces are being assembled in feeding the machine is therefore a very important matter. That is, provision should be made for the operator who feeds the short pieces to the infeed mechanism to know where the cut-off saw at the outfeed end of the machine is going to cut as respects the joints of the strip so that he can select a longer or shorter piece to make the joint fall well outside of the line of cutting. Since it is necessary to provide that the finished products may be of any predetermined odd lengths, I have incorporated into the infeed end of the machine an indicator of where the cut-off saw will pass through the continuous strip. Accordingly, to summarize, there have been complex and various difficulties to be overcome in attempting to provide a board of commercial length formed by end-to-end matching of relatively short non-uniform units.

In the above it has been emphasized that the utilization of waste short pieces of lumber and their transforming into boards of suitable commercial length must be accomplished economically. In my invention, I have provided for two lines of continuous lumber strip forming since one operator can easily feed two lines of strip forming. My invention also is applicable to a single line of forming the boards from the short pieces. The preferred form, however, of my invention involves a double line of continuous lumber strip forming and thereby two boards of predetermined length are made at the same time that a single line board is formed. Furthermore, the two lines in the preferred form are interconnected by a motor driven shaft to correlate the speed of travel of each line through the machine. Also, the two lines are interrelated and mutually functionally helpful to the other in that there is a choice for the operator of two lines in which to place a piece or unit of lumber to avoid the forming of a joint in the line of cutting of the transverse cut-off saw.

A primary object of my invention is to provide a method and mechanism for producing a merchantable piece of lumber and mechanism for carrying out the same which solves and fully overcomes all of the objections above set forth, and this in a continuous operation.

In general and briefly stated (therefore incompletely set forth), my invention or discovery involves providing an infeed mechanism of a given speed and an outfeed mechanims designed to operate at a speed less than the speed of the infeed unit when unloaded whereby when said outfeed is forced to operate at a speed substantially equal to that of the infeed due to the forcing of the continuous lumber strip through the outfeed, the outfeed motor is converted into a generator and thereby creates an elastic, magnetic resistance medium that is employed in my invention in developing a predetermined and controlled pressure on the joints of the lumber strip being formed. In line of location of the elements of the machine, the feeding mechanism is followed by a pre-heating mechanism which removes portions of the excess exuded glue, irons out and dries such portion as remains on the board to have it form a dielectric which tends to confine the high frequency currents to the glue joint. Provision is made in the pre-heating mechanism for removing the excess glue from the glue pre-heating mechanism so that continuous operation results. Next in line, the glue joint is subjected to a high frequency current, the electrodes of which are maintained in spaced relation to the continuous strip of lumber being formed. Next there is the outfeed mechanism. By providing a plurality of lines of feed and thereby the forming of two continuous strips of lumber mutually functionally helpful to each other in providing a mutually controlled speed of travel of the strips and the proper location of the joints to avoid the sawing off of the strip through a joint renders the invention capable of producing valuable products most economically.

The continuously forming of the lumber strip or strips is fundamental to the economical operation of the invention. Also, the providing of an indicator at the infeed end of the machine to designate where the cut-off saw will sever the board as it is leaving the machine operates to provide further efficiency and economy in the use of the machine.

The above-mentioned general objects of my invention together with others inherent in the same, are obtained by the mechanism illustrated in the following drawings, the same being preferred exemplary forms of embodiment of my invention, throughout which drawings like reference numerals indicate like parts:

Figure 1 is a top plan view showing the infeed end portion of a machine constructed in accordance with this invention, showing an infeed make-up table, infeed endless beds, hot rolls, and part of an electric glue curing means;

Fig. 2 is a top plan view of the outfeed end portion of the machine showing the remainder of the electrically heated glue curing means, infeed endless beds, and a flying cut-off saw;

Fig. 3 is a side elevation of the infeed portion of the machine shown in Fig. 1, the upper infeed beds, upper hot roll and the glue curing means being shown in a raised or retracted position;

Fig. 4 is a side elevation of the outfeed portion of the machine shown in Fig. 3, the glue curing means and upper outfeed beds being shown in a raised or retracted position;

Fig. 5 is a somewhat diagrammatic view partly in vertical section and partly in side elevation showing the infeed endless beds;

Fig. 6 is a detached side elevation of the upper infeed bed shown in Fig. 5, with parts omitted and showing a side frame member and some of the operating parts of said upper infeed bed;

Fig. 7 is a vertical sectional view, with parts in elevation, taken substantially on broken line 7—7 of Fig. 5;

Fig. 8 is a vertical sectional view, with parts in elevation, taken substantially on broken line 8—8 of Fig. 5;

Fig. 9 is a vertical sectional view, with parts in elevation and parts broken away showing an infeed endless bed drive shaft;

Fig. 10 is a somewhat diagrammatic detached side elevation, with parts broken away, of upper and lower hot rolls which are positioned between the infeed endless beds and the outfeed endless beds;

Fig. 11 is a fragmentary view partly in plan and partly in section of said hot rolls, taken substantially on broken line 11—11 of Fig. 10;

Fig. 12 is a sectional view through one of the hot rolls shown in Figs. 10 and 11;

Fig. 13 is a detached fragmentary plan view of a cylindrical hot plate used in one of the hot rolls shown in Figs. 10 and 11, and showing a heating element associated therewith;

Fig. 14 is a detached somewhat diagramamtic perspective view of the upper hot roll showing an inclined scraper and dried glue discharge member contracting said roll and showing said roll in an operative position relative to end joined pieces of lumber which have wet glue shown thereon;

Fig. 15 is a fragmentary perspective view showing pieces of lumber end joined in a different manner from those shown in Fig. 10;

Fig. 16 is a detached view partly in plan and partly in horizontal section of the lower hot roll shown in Fig. 10;

Fig. 17 is a horizontal sectional view, with parts in plan, of scraper supporting and collar shifting and holding means used in connection with the lower hot roll shown in Figs. 10 and 16;

Fig. 18 is a view in side elevation, with parts of a wire mesh shield omitted, showing high frequency electric glue curing apparatus through which the end joined pieces of lumber travel after they have passed the hot rolls, said view showing a lumber strip in the machine and showing electrode and hold down means in a lowered position relative to the lumber strip;

Fig. 19 is a sectional view, with parts in elevation, taken substantially on broken line 19—19 of Fig. 18, the lumber strip being omitted and the electrode and hold down means being elevated;

Fig. 20 is a fragmentary view partly in plan and partly in section, on a smaller scale than Figs. 18 and 19, looking down substantially on broken line 20—20 of Fig. 18 and illustrating the manner in which pieces of lumber under end pressure are free to dis-align themselves slightly to insure complete closing of the end joints of the same;

Fig. 21 is a somewhat diagrammatic side view illustrating driving means for the infeed endless beds and the infeed make-up table;

Fig. 22 is a somewhat diagrammatic view illustrating driving means for one set of outfeed endless beds;

Fig. 23 is a somewhat diagrammatic view illustrating driving means for the other set of outfeed endless beds;

Fig. 24 is a schematic plan view illustrating the driving means used in connection with the machine herein shown;

Fig. 25 is a schematic plan view of an alternative form of driving means which may be used in connection with this machine;

Fig. 26 is a view partly in cross section and partly in elevation taken substantially on broken line 26—26 of Fig. 3 and showing a feed table which is positioned at the infeed end of this machine;

Fig. 27 is a top plan view of a flying cut-off saw by which the end joined lumber is cut off as it is discharged from the machine;

Fig. 28 is a side view with parts in section of said flying cut-off saw;

Fig. 29 is a sectional view taken substantially on broken line 29—29 of Fig. 31, showing part of the sliding carriage means by which the cut-off saw is carried;

Fig. 30 is a sectional view, with parts in elevation and parts omitted, taken substantially on broken line 30—30 of Fig. 28;

Fig. 31 is a fragmentary sectional view, with parts omitted, taken substantially on broken line 31—31 of Fig. 28;

Fig. 32 is a schematic view illustrating raising and lowering mechanism used in vertically adjusting the feed beds and the heating or glue curing assembly;

Fig. 33 is a valve diagram illustrating the valves and hydraulic actuating and control means for the flying saw;

Fig. 34 is a diagrammatic view illustrating the application of a positive infinitely variable speed power transmission means to the flying saw;

Fig. 35 is a somewhat diagrammatic plan view illustrating the positive infinitely variable speed power transmission means shown in Fig. 34; and Fig. 36 is a somewhat diagrammatic view partly in cross section illustrating the use of feed rolls instead of feed beds for moving the lumber strip through the machine and subjecting the same to endwise compression while the glue is being polymerized.

This end-to-end press is designed to receive short pieces of lumber as they come from an end scarfing machine and glue applicator. These pieces of lumber have been end scarfed by providing on the two ends of each piece complementary transverse tongues and grooves which are adapted to interfit with mating tongues and grooves on adjacent end-to-end aligned pieces and by applying wet or other character of glue to these transversely tongued and grooved ends.

These short pieces of end scarfed lumber with wet glue on them are taken by an operator and placed in roughly aligned end to end at the right in Figs. 1 and 3. The machine shown in the drawings is designed to handle two parallel rows of random length pieces of lumber. From the feed table the pieces of lumber pass to an end press, the infeed end portion of which is shown at the left in Figs. 1 and 3 and the outfeed end portion of which is shown at the right in Figs. 2 and 4. In the end press the adjoining matched and glued ends of the pieces are pressed and held together and the glue thereon is cured and set electrically. From the end press the continuous strips of end glued lumber pass through a flying cut-off saw, shown at the right in Figs. 2 and 4, by which they are cut to predetermined length.

*Make-up feed table*

The feed table, Figs. 1, 3, and 26, comprises a horizontal frame 40 mounted on legs 41. Upright brackets 42 are secured to the frame 40 near the respective ends thereof and shafts 44, 45, 46 and 47, see Fig. 26 and dotted lines Figs. 1 and 3, are rotatively supported by these brackets. Also, table top means 48, Fig. 26, is supported in a horizontal position above the brackets 42. Preferably, side and end plate means 49 supports the table top means 48 and is secured to the frame 40 to provide an enclosure for the brackets 42 and parts carried thereby.

Two endless traveling feed belts 50 and 51 of slat belt type are supported in side by side relation on the table top means 48 of the feed table. This provides for the feeding of two lines of lumber to the end press. These feed belts are carried on belt carrying wheels 43, Fig. 26.

The two feed belts 50 and 51 are slightly inclined toward each other from the outer toward the inner end of the feed table. This positions the two feed belts so they will tend to transversely move pieces of lumber which are carried thereon toward the center of the machine and thus crowd the pieces of lumber against a medial guide member 52 to insure proper longitudinal alignment of the pieces of lumber before said pieces enter between the feed beds of the end press.

Due to the inclination of the feed belts relative to each other the two shafts at each end of these feed belts are not in axial alignment and hence an independent shaft is provided at each end of each feed belt.

The two shafts 44 and 45 adjacent the end press are preferably driven from a shaft 55 which is driven by a motor 56 which also drives infeed endless beds of the end press as hereinafter described. The driving means between shaft 55 and feed table shafts 44 and 45 is diagrammatically shown in Figs. 3, 21 and 26. This driving means includes a link belt 57 which passes around a sprocket wheel 58 on the shaft 55 and around an idler sprocket wheel 59, and which further has a driving engagement with another sprocket wheel 60 on a counter shaft 61. The counter shaft 61 extends across the feed table. The shaft 45 which carries feed belt 51 is driven from the counter shaft 61 by a link belt 62 which passes around sprocket wheels 63 and 64. The shaft 44 which carries feed belt 50 is driven from the counter shaft 61 by a link belt 65 which passes around sprocket wheels 66 and 67.

Two hold down wheels or rollers 68 and 69, Figs. 1 and 3, are provided above each feed belt 50 and 51 adjacent the end of the feed table which is connected with the end press. These rollers are omitted in Fig. 26. Each hold down roller 68 and 69 is rotatively supported by a link member 70 which is pivoted to a frame bracket 71. A compression spring 72 on a rod 73 yieldingly urges each roller 68 and 69 toward the feed belt above which it is positioned. The hold down rollers 68 and 69 thus yieldingly hold the material down on the feed belts at a location a short distance in advance of the point where the material enters between the first set of feed beds of the end press.

A transparent housing and lamp shield 76 extends longitudinally of the medial guide member 52 substantially throughout the length of the feed table and a plurality of electric signal lamps 75 are provided at spaced intervals in this housing. These signal lamps are thus spaced apart lengthwise of the feed table. The lighting of these lamps is controlled from the flying saw and the lamps function, in a manner hereinafter explained, to indicate to an operator who is feeding the machine the positions at which the lumber will be cut off by the flying saw after it has passed through the machine. This enables the operator to feed the machine in such a manner as to prevent the strips of lumber from being cut through the joined ends or too close to the joined ends of the pieces by the flying saw and thus prevents waste and conserves lumber.

*End press*

The portion of this machine wherein the matched and glue coated ends of the pieces or units of lumber are pressed and held together and in which the glue is cured and set is herein termed the end press.

The frame of this end press, Figs. 3 and 4, comprises longitudinally extending spaced apart horizontal frame members 80 connected by transverse frame members 81 and supported by upright leg members 82 and base frame parts 83.

In general, the end press mechanism comprises an infeed endless bed section A, a glue curing or heater section B, and an outfeed endless bed section C. A hot roll section D is positioned between the infeed endless bed section A and the glue curing setting or polymerizing section B and is preferably carried by the infeed endless bed section A.

Each of the sections A, B, C, and D, as shown in Figs. 1 to 4, comprises two side by side units to thereby provide a double or duplex machine having two side by side lines of random length, short, end joined units or pieces of lumber. These two lines of mechanism are of substantially duplicate construction but are interconnected and function jointly in cooperation as hereinafter explained.

The infeed means preferably comprises endless bed sections to provide low unit area pressure. Thus, the necessary feeding force is provided without danger of injuring the joints by too great compression force or otherwise incurring objectional results. But, it is later understood, that the well known ordinary standard type of roller feed providing line pressure contact may be used if desired, or conditions permit. Such a roller feed is shown in Fig. 36 having infeed rollers 370 and outfeed rollers 371 with the continuous lumber strip 39 being fed therethrough. Said lumber strip is formed of relatively short, random length pieces or units 39'.

Each endless bed section embodies two upper endless beds and two lower endless beds, shown in Figs. 1, 2, 3 and 4, and which in a general way, are of conventional construction. One cooperating pair of these beds, that is an upper bed and a lower bed, are shown more fully in Figs. 5 to 9, inclusive, and it will be understood that the other pairs of beds are of similar construction. Also fragments of a bed plate 222 are shown in Fig. 5.

In a general way the upper bed shown in Figs. 5 to 9 comprises two side frame members 84 and 85 supported in spaced apart parallel relation by rigid frame means 86. Two cross shafts 87 and 88 are supported by the side frames 84 and 85 near the respective ends of said frames. A sprocket wheel 89 is carried by the shaft 87 and preferably a roller 90 is carried by the other shaft 88. An endless link belt 91 is operatively disposed to run on the sprocket wheel 89 and roller 90. Tread or slat members 92 are carried by the endless link belt and are adapted to form a Caterpillar type track. Two endless roller chains comprising rollers 93 connected by links 94 are each supported on a shoe or track which preferably is formed of two parts 95 and 96. The parts 95 and 96 are preferably relatively longitudinally adjustable to provide take-up for the roller chains. Two transversely spaced apart roller chains 93—94 are provided to support the respective end portions of the tread members 92, Fig. 7, and the tread members 92 are carried on these roller chains which provide a firm support for the tread members and minimize friction. A track 95—96 is provided for each roller chain and these two tracks are secured to a medial bracket 97 as by bolts 98. The bolts 98 preferably extend through slots 99 in one of the track parts such as part 96 to provide adjustment. The bracket 97 has upwardly extending spaced apart integral flanges 100 which are connected by pivot members 101 with two bell cranks 102 and 103. The hub parts of the two bell cranks 102 and 103 are keyed or otherwise secured to cross shafts 104 and 105 respectively. The upper ends of the two bell cranks 102 and 103 are connected with each other by a link 106 to synchronize the movement of the two bell cranks and keep the two track members 95—96 horizontal. Two pneumatic cylinders 107 and 108, Fig. 6, are mounted on the side frame 84 and have piston rods 109 and 110, respectively, which engage with levers 111 and 112 on shafts 104 and 105 so that when fluid pressure is admitted to the cylinders 107 and 108 a downward pressure will be exerted on the track members 95—96 to press the treads 92 of the endless traveling link belt 91 down on the lumber.

When the fluid pressure within the cylinders 107 and 108 is relieved the track means 105—106 and link belts carried thereby are raised by a compression spring 113 which exerts a pressure against a lever 114 on a shaft 115. The spring 113 is supported on an eye bolt 116 which is connected by pivot means 117 with the upper portion of the side frame member 84. Washer and nut means 118 on the eye bolt 116 receive the lower end of the spring 113. Between the two side frames 84 and 85 the shaft 115 is provided with a lever 119 which is connected by a pivot 120 with one end portion of a chain take-up bracket 121 over which the upper lap of the endless link belt 91 passes. Another lever 122 similar to the lever 119 is connected by a pivot member 123 with the other end portion of the chain take-up bracket 121 and the lower end portion of the lever 122 is pivotally supported by a shaft 124. The two lever arms 119 and 122 are parallel and of equal length and insure equal movement of the two end portions of the chain take-up bracket. The spring 113 exerts a resilient take-up force on the link belt 91 at all times and yields when pressure is admitted to the pneumatic cylinders to push the slats or treads 92 down on the lumber.

The shaft 87 is a driven shaft and the sprocket wheel 89 is keyed or otherwise fixedly secured thereto. The shaft 88, see Fig. 6, preferably is flattened on opposite sides at the locations where it passes through the frame members 84 and is adjustably and non-rotatively supported in slots 126 in said frame members. Roller 90 is rotatively mounted on shaft 88. An adjusting rod 127 is secured to each end portion of the shaft 88 and extends perpendicularly therefrom along the side frame 84 and toward the other shaft 87. A combined nut and worm gear 128 is threaded onto the rod 127 and supported by the frame 84 for longitudinally moving the rod 127 to adjust the shaft 88 and take up slack in the line belt 91. A worm 129 on a cross shaft 130, see also Fig. 5, meshes with the worm gear 128 for rotating the same. Shaft 130 may be turned by applying a wrench to a squared end portion of the same. The shaft 87 of the infeed endless beds A preferably extends entirely across the two side by side top bed units as diagrammatically shown in Fig. 24. Preferably an independent shaft 88 is provided in each upper infeed endless bed as diagrammatically shown in Fig. 24. In the upper outfeed endless beds C two independently driven shafts 88b and 88a, Fig. 25, more fully hereinafter described, preferably are used at the driven end of said beds instead of a single shaft such as shaft 87 which is common to the top beds of the infeed section A.

The lower bed shown in Figs. 5 and 8 are similar in general to the upper bed. Said lower bed comprises frame parts 133, 134 and 135, shafts 136 and 137, sprocket wheel 138, roller 139, link belt 140, treads 141 and rollers 142, connected by links 143, all of which are respectively similar to the previously described parts 84 to 94, inclusive, of the upper bed. The track parts 145 and 146 of the lower bed, Fig. 5, are similar to the track parts 95 and 96 of the upper bed except that the track parts 145 and 146 are directly secured to the side frame members 132 and 133 and are not vertically adjustable but are fixed so that the top surfaces of the link belt treads 141 carried thereby are flush with the bed plate 222.

The outfeed means, also, comprises endless bed sections. The feed beds of the outfeed endless bed section C have their driven shafts positioned at the ends thereof which first come in contact with the advancing lumber strip and the outfeed beds in each line of production in the machine shown in Figs. 1 to 12, and 24 are driven by independent motors 312 and 327 to provide a predetermined, i.e. adjusted, constant back pressure on the lines of lumber passing through these beds to bring the finger portions of the units of lumber into direct contact and close the joints. Also, such back pressure holds the joints closed and squared.

This back pressure is developed by reason of the differential speed of the motors driving the infeed and outfeed means. As shown, the motors driving the outfeed endless bed sections are adjusted to operate normally when unloaded at a speed less than that of the infeed motors. But since the continuous strip of lumber 39 being fed through the machine forces the outfeed means to operate at substantially the same speed as the infeed means, the motors connected to the outfeed means are compelled to operate at about the same speed as the motors driving the infeed means, that is, the said outfeed connected motors are converted into generators. These latter motors thus absorb power and develop a back pressure on the continuous strip 39 of lumber, due to the strain on the magnetic flux of the motors as they become generators.

However, it will be understood that this same result may be obtained by driving the infeed beds of each production line with independent motors, as diagrammatically illustrated in Fig. 25 and hereinafter described.

Hot rolls

Hot rolls C are provided between the infeed endless beds A and the glue curing section B to remove some excess glue from the end joined portions of the lumber and to roll down, iron and smooth out and surface-dry some of the wet glue which, by pressure, is caused to exude from the lumber at the location of the end joints.

These hot rolls, shown in Figs. 1, 3 and 10 to 17 inclusive, are preferably carried by the infeed endless beds and are driven therefrom and the lumber passes between an upper roll and a lower roll and both rolls are driven so that their lumber contacting surfaces move over the lumber in a direction opposite to the direction of movement of the lumber, thereby augmenting their said functions and drying the surface of the lumber. These rolls are preferably electrically heated.

The upper hot roll assembly, Figs. 1, 3, 10, 11 and 12, comprises a roller 150 rigidly secured to an internal ring member 151 which is positioned midway between the two ends of the roller 150. The ring member 151 is rigidly secured to a tubular sleeve 152. The sleeve 152 is secured to a shaft 153 by fins 154. The sleeve 152 is of larger diameter than the shaft 153 and air passageways 155 are provided between these two parts for air used to cool bearings, as hereinafter explained. This air may escape through radial openings 156 in the parts 152, 151 and 150.

The shaft 153 is mounted in bearings 157, one of which is shown in Fig. 11. Bearings 157 are carried by non-rotatable hub means 158 and the hub means 158 is supported by a bracket 159 which has a limited amount of pivotal movement about a short shaft or pivot member 160. See Figs. 10 and 11, and about a similar pivot member 161 at the opposite side of the machine, see Fig. 1, to thereby provide for some adjustment of the hot roll toward and away from the lumber. The hub 158 has passageways 149 therein which connect with a supply conduit 147 for cool air which cools the hub 158 and the bearings 157. The hub 158 has a non-rotatable cylindrical hot plate 162 secured thereto and the hot plate 162 carries electric heating elements 163. The heating elements 163 may be of the form shown in Fig. 13. The non-rotatable hot plate 162 is in close enough proximity to the rotatable tube 152 so that very little air is allowed to circulate between these two parts and the hot plate is not undesirably cooled and yet the heating of the bearings is limited. It will be understood that a bearing and hub and hot plate similar to parts 157, 158 and 160 respectively are provided at the other end of the hot roll 150. A cylindrical cover ring 148 of insulating material is carried by the hub 158.

The shaft 153 has a gearwheel 164 secured thereon. The gearwheel 164 meshes with another gearwheel 165 which is rotatably mounted on the pivot member 160.

A sprocket wheel 166 secured to the gearwheel 165 is driven by a link belt 167 which passes around a sprocket wheel 168. The sprocket wheel 168 is secured on the driven shaft 87 of the upper endless infeed beds. This drives the roll 150 in the direction indicated by the arrow in Fig. 10 so that the lumber contacting portion of said roll is moving counter to the direction of travel of the lumber.

A curved scraper 146 is positioned in engagement with the roll 150 to scrape glue off of the same and to prevent an accumulation of dried glue on this roll. This scraper 146 is curved in cross section and has a beveled and curved roll engaging edge 169 which contacts the roll 150 in a curved or spiral path from end to end of the roll 150 constructing and positioning the scraper 146 so that the edge 169 thereof engages the roll in a spiral path provides more efficient cleaning of the roll and making the scraper trough shape in cross section and inclining the same provides for discharging the dried glue at one side of the machine.

A top hot roll supporting bracket, see Figs. 1, 10 and 11, comprising two curved side arms 170 and 171, connected by a rigid iron bar 172, is secured to the frame means 84—85 of the infeed endless beds A and serves as supporting means for the upper hot roll assembly. The pivot pins 160 and 161 are connected with the outer end portions of these brackets 170 and 171 respectively and are rigidly supported thereby. The previously mentioned bracket 159 is mounted for limited swinging movement on the pivot pins 160 and 161 and supports the hot roll 150. The gearwheel 165 and sprocket wheel 166 are rotatively mounted on the pivot pin 160.

The scraper 168 has arms 173 and 174, Fig. 14, rigidly secured thereto and these arms 173 and 174 are connected by pivot means 175 with the movable bracket 159 which carries the hot roll 150. The weight of the scraper 168 holds it in contact with the roll 150. Dry glue which is scraped off of the hot roll 150 collects in the concave scraper and discharges from the lower end thereof.

The bracket 159 has a rigid bumper lug 178 provided thereon and this bumper lug 178 is adapted to abut against an adjustable stop pin 179 which is guided and supported in the bracket cross bar 172, Fig. 10. Stop pin 179 is threaded through a nut 180 which is welded to the cross bar 172 and has a lock nut 181 to lock it in adjusted position.

A rigid overhanging bracket 182 is secured to the fixed cross bar 174. A pneumatic cylinder 183 is secured to the bracket 182. A piston 184 in the cylinder 183 has a piston rod 185 which engages with the movable bracket 159 in substantially opposed relation to the bumper lug 178. When fluid under pressure is supplied to the cylinder 183 it causes the piston 184 and rod 185 to press the hot roll 150 down on the lumber. The downward movement which can be thus imparted to the hot roll 150 is limited by the stop pin 179. Provision is made to admit fluid under pressure to the cylinder 183 through a conduit 186 whenever lumber is moving under the hot roll 150.

Devices are provided to lift the hot roll 150 clear of the lumber when pressure in the cylinder 183 is relieved. The hot roll lifting devices herein illustrated comprise preferably two bolts 187 threaded into the movable bracket 159 and extending outwardly therefrom through holes 188 in the rigid overhanging bracket 182. A compression spring 189 on each bolt 187 abuts against the bracket 182 and against nuts 190 on the outer end portion of the bolt 187 and exerts a resilient force tending to angularly move the bracket 159 about the pivot members 160 and 161 in the proper direction to lift the hot roll 150 clear of the lumber. Preferably, a housing 191 encloses the gearwheels 164 and 165 and sprocket wheels 166 and 168 and link belt 167.

A lower hot roll assembly, Figs. 10, 16 and 17, somewhat similar to the previously described upper hot roll assembly, is positioned below said upper hot roll assembly. This lower hot roll assembly comprises a cylindrical metal roller 200 secured by a medially positioned internal ring member 201 to a tube 202. The tube 202 is secured to a shaft 203 and is spaced from the exterior of said shaft 203 to provide air passageways 204 for cooling air. Passageways 204 communicate with a passageway 204' in the ring 201.

A shaft 205 is positioned at the side of the roll 200 which is shown at the left in Figs. 1, 3 and 10 and is parallel with the roll 200. This shaft 205 is rigidly supported from the main frame of the machine by two frame brackets 206 and 207. A frame bar 208 is rigidly secured to the brackets 206 and 207 and extends crosswise therebetween. Two spaced apart angularly movable two part brackets 209 and 210 are rigidly connected with each other by a tubular cross bar 211 and are supported for limited oscillatory movement on the fixed shaft 205. These brackets 209 and 210 carry non-rotatable hubs 212 and 213 within which bearings 214 for the shaft 203 of the lower hot roll are supported. The non-rotatable hubs 212 and 213 support cylindrical hot plates 215 and 216 which carry heating elements 163 of a type previously described.

The cross bar 211 which rigidly connects the two brackets 209 and 210 has a shoulder 217 which is adapted to be engaged by a piston rod 218. The rod 218 is attached to a piston 219 in a cylinder 220. When elastic fluid such as air under pressure is admitted through conduit 221 to the cylinder 220 the piston 219 and rod 218 are moved to the foremost limit of their travel and the lower hot roll is resiliently supported flush with the bed plate 222 of the machine by the compressed elastic fluid in the cylinder 220. When pressure in the cylinder 220 is relieved the weight of the lower hot roll assembly will move the hot roll 200 down so that its uppermost peripheral part will be a short distance below the plane of the bed plate 222 of the machine.

The lower hot roll 200 has an external guide ring 223 secured thereon midway between the two ends thereof. The thickness of this guide ring is less than the thickness of the thinnest lumber which will be processed in the machine and the edges of the strips 39 of lumber contact this guide ring and are guided thereby.

Two transversely movable hold-over rings 224 and 225 are provided on the lower hot roll 200 adjacent the respective ends thereof. The rings 224 and 225 engage with the outer edges of the strips of lumber and press them against the medial guide ring 223. Adjustable spring pressed scraper supporting shifter means of the form shown in Fig. 17 is carried by the brackets 209 and 210 and is connected with the hold-over rings and functions to support scrapers and to adjust the hold-over rings 224 and 225 for lumber strips of different width and to provide for resiliently pressing these hold-over rings against the edges of the strips of lumber.

This adjustable spring pressed shifter means comprises two slide members 226 and 227 movable in the slotted tubular cross bar 211 and having adjusting screws 228 and 229 respectively threaded thereinto. A plate 230 is secured to each slide member by means which extends through a longitudinal slot 231 in the cross bar 211. A shifter fork 232 is secured to each plate 230 and engages within a groove 233 in one of the hold-over rings 224 or 225. The two screws 228 and 229 extend outwardly through a cap 234 on the end of the slotted tubular cross bar 221 and have squared ends by which they may be turned to adjust the slide members 226 and 227. A compression spring 235 on the adjusting screw 228 bears against a collar 236 and provides for resiliently urging the hold-over ring 224 against the lumber. Another compression spring 237 on the adjusting screw 229 presses against a collar 238 and provides for resilient application of the other hold-over ring 225 to the lumber.

Two scrapers 239 and 240 are secured respectively to the two plates 230 by pivot members 241 and are positioned to engage with the bottom roll 200 to scrape dried glue off the same. Preferably each scraper 239 and 240 is resiliently urged into contact with the roll 200 as by a compression spring 242.

The scrapers 239 and 240, being carried by the plates 230, are adjustable along with the hold-over rings 224 and 225. Also, these scrapers 239 and 240 may be replaced by other scrapers of different width if the product requires.

Two other scrapers 247 and 248 are secured to and carried by the tubular cross bar 211 and are positioned to engage with the hot roll 200 adjacent the medial guide ring 223. These scrapers 247 and 248 are angularly offset around the hot roll 200 from the other scrapers 239 and 240 and this allows for relative overlap of the scrapers on the roll if desired.

The lower hot roll 200 is driven from the shaft 136 of the adjacent lower feed bed as by a link belt 250 operatively engaging sprocket wheels 250 and 251 on shafts 136 and 205. A gearwheel 253 is rigidly secured to the sprocket wheel 251 and mounted on the shaft 205 by bearing means 254. Another gearwheel 255 on the shaft 203 meshes with the gearwheel 253 and the lower hot roll 200 is rotatively driven thereby in a direction such that the surface portion of the hot roll 200 which contacts the lumber is moving counter to the direction of the movement of the lumber. A housing 244 encloses the gearwheels 253 and 255 and sprocket wheels 251 and 252 and link belt 250.

The upper beds of the infeed endless bed assembly A are supported for vertical movement or adjustment on four upright shafts 256, two of which are shown in Fig. 3 and two of which are positioned on the other side of the machine and are shown schematically in Fig. 32. Each upright shaft 256 is guided in a fixed guide tube 257 and has a threaded lower end portion 256', Fig. 3, which is received within a combined unit and worm wheel 258 in a housing 259. Two cross shafts 260 and 261, Fig. 32, connect shafts 256 on opposite sides of the machine and have worms 262 which mesh with the nut and worm wheels 258. The shafts 260 and 261 are operatively connected with a common power shaft 263 by worm gears 264, countershaft 265, gearwheels 266, and clutch 267. The clutch 267 is normally held engaged as by a compression spring 268 and can be disengaged and held released as by a lever 269. Preferably a reversible motor 246, Fig. 3, is connected with the shaft 263 as by belt means 245 for driving said shaft 263.

The means for vertically adjusting the heater unit B and the upper beds of the outfeed endless bed assembly C is similar to the mechanism just described and like parts, insofar as shown, are similarly numbered. The shaft 263 is common to the three units A, B and C and all of said units can be moved up and down in synchronism or these units can be separately adjusted by disconnecting and holding disconnected the clutches 267 of the unit or units which are not to be moved.

*End press drive means*

The driving means for the infeed endless beds A is disposed within a housing 311, Figs. 1, 3 and 21, and this driving means is diagrammatically shown in Fig. 21. As previously explained in connection with the driving means for the feed table belts 50 and 51, the motor 56 drives a shaft 55 which is positioned near the head end of the end press. A sprocket wheel 300, Fig. 21, on said shaft 55 drives a link belt 301. The link belt 301 passes around a sprocket wheel 302 on the shaft 136 which is common to both of the lower beds of the infeed endless bed assembly A. Also this same link belt 301 passes around another sprocket wheel 303 on the shaft 87 which is common to both of the upper beds of infeed endless bed assembly A. This provides for driving all four of the infeed endless beds at the same rate of speed from the motor 56. This motor 56 is preferably a direct current motor and is capable of being controlled or adjusted so that it will tend to run at a predetermined speed and will tend to drive the infeed endless beds faster than the driving means when unloaded for the outfeed endless beds tends to drive them. This difference in speeds makes it possible to exert a predetermined or adjustable constant compression force on the lumber strip 39 between the infeed and outfeed endless beds.

For the purpose of permitting raising and lowering movement of the upper infeed endless bed without undesirably loosening or tightening the link belt 301 said link belt is caused to pass around an idler sprocket wheel 304 which is rotatively supported by a bearing 304' on the movable end portion of a lever arm 305. The other end portion of the lever arm 305 is mounted on a fixed pivot member 306 which may be rigid with the frame of the machine. A link preferably formed of two pieces 307 and 308 adjustably secured together, as by slot and bolt means 309, has one end portion pivoted on an axis coincident with the axis of the shaft 87 and has its other end portion connected by a pivot 310 with the lever arm 305 about midway between the two ends of such lever arm. Obviously the link 307—308 and the lever arm 305 and idler sprocket wheel 304 will be moved up and down in synchronism with the upper feed bed and the idler sprocket wheel moving in the bend of the link belt 301 will compensate for up and down movement of the upper feed bed and keep the tension of the link belt substantially constant. Slackness in said link belt 301 can be taken up by adjusting the overall length of the link 307—308.

The hot rolls 150 and 200 are driven from the shafts 87 and 136 of the infeed endless beds A, as hereinbefore explained.

The portions of the lumber strips 31 between the infeed endless beds A and the outfeed endless beds C are under predetermined constant endwise compression for the purpose of pushing and holding together the joined ends of the random length pieces of lumber. Under these conditions it has been found that the take-up in the portions of the two lumber strips between the infeed endless beds A and the outfeed endless beds C is variable. To compensate for this variation in take-up it is desirable to provide independent driving means for either the two outfeed endless beds or the two infeed endless beds in each line of production.

The two outfeed endless beds in each line of production are illustrated as being independently driven in Figs. 1 to 24, inclusive, while these same figures show all of the infeed endless beds as synchronously driven from the same source of power.

As slippage may occur between the continuous strip of lumber and the outfeed beds in the case of independently driven endless beds in Figs. 1 to 24, and since the flying saw is driven from the same shaft which drives a lower bed of the outfeed mechanism, there develops the situation where the flying saw may not be carried forward synchronously at the predetermined speed of the continuous strip. To overcome this it is desirable to provide a driving means from the outfeed endless beds, in each line of production, see Figs. 2, 22, 23, 24 and 27, as more fully hereinafter described in connection with the flying saw, and thus danger to the flying saw is obviated.

It will be understood that both the forms of driving means illustrated in Fig. 24 and Fig. 25 are the same so far as the outfeed motor driving means are compelled to run as generators by reason of the continuous strip between the infeed and outfeed means, as hereinbefore described in developing the back pressure.

In the case of the form shown in Fig. 24, the greater unit pressure on the continuous strip (i.e., the greater gripping pressure on the strip in developing the infeed force, herein referred to as the feeding force), is applied to the continuous strip at the feed end and any difference in travel speed of the strips due to slippage or take-up is taken care of at the outfeed end.

Fig. 25 shows diagrammatically, modified driving means in which the infeed beds A in each line of production are independently driven while the outfeed beds C are synchronously driven from the same source of power. In this case, the slippage which may occur between the infeed means and the continuous strip of lumber is provided for at the infeed end of the machine and therefore there is no danger of the flying saw not being moved synchronously with the moving strip of lumber since the outfeed means for both strips is constant as they have a single common shaft. The unit pressure in the case of the form shown in Fig. 25 is greater on the outfeed end, i.e., on the outfeed endless beds C, than on the infeed endless beds A so that the slippage can be taken care of by the infeed means. By "take-up" it will be understood that reference is made to the pressing together of the units of lumber to a greater extent in one continuous strip than in the other.

The driving means for the pair of endless outfeed beds in the line of production nearest the side of the machine shown in Figs. 3 and 4, this being the left side as respects the direction of travel of the lumber through the machine, is disposed within a housing 325 and is diagrammatically shown in Fig. 22. The driving means for the pair of endless outfeed beds shown in the other or right-hand line of production of the machine is disposed within a housing 326 and is diagrammatically shown in Fig. 23.

The driving means shown in Fig. 22 comprises a motor 312 which drives a shaft 313. The motor 312 is preferably a direct current motor and is capable of being controlled so that it will tend to run at a predetermined speed and will tend to drive the left-hand set of beds of the outfeed endless bed assembly C slower than the beds of the infeed endless bed assembly A are driven. Thus, the set of outfeed endless bads are caused to exert a back pressure on the advancing lumber strips 39. It is to be noted that the lumber strips 39 compel the outfeed endless beds C to move at substantially the same speed as the infeed endless beds and that the motor 312 normally functions as a brake instead of functioning as a driving means.

This driving means illustrated in Fig. 22 includes a sprocket wheel 314, a link belt 315, two sprocket wheels 316 and 317 secured on respective shafts 137a and 88a of the outfeed endless beds, an idler sprocket wheel 318, a lever 319, a pivot 320 for said lever, a link formed of two parts 321 and 322 adjustably connected by slot and pin means 323 and a pivot 324 connecting the link 321–322 with a medial point of lever 319. Parts 314 to 324 in Fig. 22 are similar respectively to parts 300 to 310 of Fig. 21 and function in a similar manner to drive the two outfeed endless beds in the left-hand line of production of the machine. In the outfeed endless beds the driving torque is applied to the shafts 88a and 137a at the ends of the beds with which the advancing lumber strips first engage. This provides a better driving arrangement for the outfeed endless beds, which exert a back pressure rather than a forward thrust on the lumber, than would be provided by connecting the driving means with the shafts at the other ends of these beds.

The driving means shown in Fig. 23 comprises a motor 327 which drives a shaft 328 and functions in the same manner as the previously described motor 312 to exert back pressure or compression on the lumber strip in the right-hand line of production of the machine. The shaft 328 carries a sprocket wheel 329 around which passes a link belt 330. Said link belt 330 also successively passes over and around sprocket wheels 331, 332, 333, 334, 335 and 336. The sprocket wheels 331, 332, 333 and 336 are idler sprocket wheels. The sprocket wheels 334 and 335 are secured respectively to the shafts 88b and 137b which carry the upper and lower outfeed endless beds in the righthand line of production of the machine. It is to be noted that the shafts 88b and 137b are positioned at the end of the outfeed endless bed assembly which is first engaged by the lumber strips as they move through the machine.

The idler sprocket wheel 333 is rotatively mounted on a frame plate 337 which is secured to the upper endless outfeed bed and moves up and down with said upper endless outfeed bed and with the driving sprocket 334 therefor. The idler sprocket wheel 332 is positioned above the idler sprocket wheel 333 and is rotatively mounted on a fixed part of the machine frame and is not vertically movable. As the upper outfeed endless bed is moved up and down the idler sprocket wheel 333 will be moved toward and away from the idler sprocket wheel 332 and thus will provide the necessary adjustment of link belt 330 to compensate for verticle movement of the upper outfeed endless bed and maintain proper tension of the link belt 330.

Fig. 25 illustrates diagrammatically an infeed endless bed assembly A and an outfeed endless bed assembly C having modified driving means. In said Fig. 25 the beds in the two production lines of the outfeed assembly C are driven from a common motor 337 by driving means which may be similar to that shown in Fig. 21. The beds in one production line of the infeed endless bed assembly A are driven by one motor 338 while the beds in the other production line of this infeed endless bed assembly A are driven by another motor 339. This provides for unequal take-up of the lumber strips 39 under compression but keeps the speed of the two lumber strips which are delivered to the flying saw always constant and makes it possible to do away with the over-running clutches in the driving connection between the outfeed endless beds and the flying saw.

*Glue curing means*

From the hot rolls the strips of lumber pass to the glue curing section B of the machine where the setting of the glue in the joined ends is completed by high frequency radiation. In the glue curing section B each strip of lumber 39 is supported on the bed plate 222 and is held down by preferably two resiliently supported aligned hold-down shoes 270 and 271 of insulating material. In this glue curing section each lumber strip is subjected to high frequency radiation from an electrode 272 preferably formed of two spaced apart parallel electrically connected bars of electrically conductive material. The hold-down shoes 270 and 271 and electrodes 272 are shown in a lowered or operative position in Fig. 18 with the hold-down shoes 270 and 271 resting on a lumber strip 39 and an electrode 272 in close proximity to the lumber strip 39. In Fig. 19 these parts are shown in a raised position. These hold-down shoes 270 and 271 and electrodes 272 and supporting members for the same are in duplicate at the two sides of the machine and like parts in the two production lines are similarly numbered.

The hold-down shoes 270 and 271 and electrodes 272 are suspended from a rectangular frame which comprises two side bars 273 and 274, herein shown as angle bars, and a plurality of cross bars 275. This frame is supported for vertical movement by preferably four power driven raising and lowering devices 256 of a form hereinbefore described and which are of duplicate construction and are positioned near the respective corners of the frame as indicated by dotted lines in Figs. 1 and 2.

The two spaced apart parallel bars of each electrode are connected with each other by two cross bars 277 positioned near the respective ends of the electrode and by another cross bar or plate 278 positioned approximately one-third of the distance back from the front end of the parallel bars. The electrical connection to the electrodes is by way of the plate 278.

Two L-shaped brackets 279 of insulating material have their respective lower end portions attached to the end cross bars 277 of each electrode and extend upwardly and have their upper end portions attached by means of angle plates 293 to a side bar 273 or 274 of the rectangular frame. Thus the electrodes are rigidly and nonresiliently supported from the vertically movable rectangular frame.

The two hold-down shoes 270 and 271 in each line of production are positioned between the two spaced apart parallel bars of the electrode 272 and extend below the bottom plane of the two bars which form the electrode. Two notches 280 and 281 are provided in the respective hold-down shoes 270 and 271 to afford clearance for the end cross bars 277 and L-shaped brackets 279 which support the electrode 272.

Each hold-down shoe 270 and 271 has two opposed angle brackets 282 secured to the upper edge portion thereof to facilitate attachment of the hold-down shoe to horizontally positioned U-shaped flat metal springs 283. One of the springs 283 is positioned adjacent each end of each hold-down shoe. Each spring 283 is positioned between two guide and supporting brackets 284 of inverted L-shape. Bolts 285 extend through the springs 283 and through the upper flanges of the brackets 284 and through cross bars 275 of the vertically movable rectangular frame and secure both the springs 283 and the brackets 284 to said frame. Shims or spacer blocks 286 are provided between the angle brackets 282 and the lower arms of the springs 283 and bolts 287 secure the angle brackets 282 and shims 286 and springs 283 together. This secures each end portion of each hold-down shoe 270 and 271 to one of the springs 283 and provides resilient support for the hold-down shoes.

In addition to supporting the hold-down shoes 270 and 271 from the springs 283 these hold-down shoes are further supported and guided from the brackets 284 by multiple part transverse support members 288 which extend through slots 289 in the hold-down shoes 270 and 271. These support members 288 support the hold-down shoes 270 and 271 against the drag of the moving lumber strips 39 and limit resilient vertical movement of said hold-down shoes. Bolts 290 extend transversely through the multiple part support members 288 and through the brackets 284 and rigidly secure the same together. The hold-down shoes 270 and 271 resiliently engage the lumber strips 39 and hold the same down and the electrodes 272 are normally held in spaced relation above the lumber strip.

Preferably a shield or cover of inverted basket-shape is provided for the entire glue curing section B of the machine. This cover comprises a frame 291 and wire mesh covering 292 which may be lifted clear of the machine.

The lumber strips 39 which are moving through the glue curing section B of the machine are under compression and are free to dis-align themselves slightly in a longitudinal direction to insure a complete closing of the end joints and to insure that there will be no relative movement in these end joints while the glue is being set. This is accomplished by providing on the bed plate 222 in the glue curing section B a medial guide member 291 (see Fig. 20) which is slightly convergently tapered in the direction of travel of the lumber, and also by providing on bed plate 222 a plurality of emergency side guide members 292 having rounded corners. The emergency rounded corner guide members 292 are spaced outwardly from the normal path of the lumber so that they will ordinarily be clear of the edge of the lumber strip 39 but will be engaged by the lumber strip in case of excessive disalignment of said lumber strip which otherwise might cause this strip to buckle sidewise. The lumber strips 39 are thus allowed to move free of contact with the side guide means through the glue setting section B of the machine. The spacing of the guide members 292 with respect to each other is for the purpose of affording easy access to the strips 39 of lumber in case of emergency.

A high frequency electrical conductor member 295 of coaxial cable type enters the heater section B of the machine through a tube 296 of insulating material and is electrically connected by flexible strips 297 of copper or like electrically conductive material with the plates 278 of the electrodes 272.

A loading or turning coil 298 has one end portion connected with the bar 278 of one of the electrodes 272 and the other end portion connected with frame member 274. This coil 298 functions as part of the tuned circuit.

Connecting the incoming conductor members 297 with the electrodes 272 nearer to the forward end of said electrodes has to do with the high frequency electrical characteristics of the tuned circuits.

The lumber strips 39 shown in Figs. 10, 14, 18 and 30 are made up of a plurality of pieces 39' of lumber, usually of random length. These pieces 39' are end grooved or scarfed to provide interfitting tapered fingers or tongues 77 and grooves 78, Fig. 10, which extend across the ends of the pieces 39' in the plane of said pieces. The interfitting tongues 77 and grooves 78 are dimensioned and tapered so that they will fit snugly when they are pressed together by the longitudinal compression exerted by the feed beds. This endwise compression will squeeze some of the wet glue 38, Fig. 14, out of the joints and this glue will stand out from the surface of the lumber before the joints contact the hot rolls 150 and 200. When the wet glued joint passes between the hot rolls, which are moving counter to the direction of movement of the lumber, this exuded wet glue will be rolled down and smoothed out and pre-cured and partially picked up and removed by the hot rolls and only a thin film 37 of surface dried glue will be left on the surface of the lumber after the joint has passed between the hot rolls. This thin film 37 of dried glue is a better electrical insulator than wet glue and minimizes electrical damage to the lumber as it passes through the heating section B of the machine.

The guide rings 223, 224 and 225 level down and dry the exuded glue on the edges of the lumber strips 39.

Obviously the shape and form of the tongues and grooves on the ends of the pieces may be varied and Fig. 15 shows a modified form of end joint in which two pieces 79 of lumber are end scarfed to provide interfitting tongues and grooves 79' which extend crosswise of the plane of the pieces 79. That is, while said form of splicing is found preferable, other types of splicing, even square abutted ends, may be glued—all depending upon the purpose or use of the newly formed board.

*Flying saw*

The flying cut-off saw means, by which the end jointed pieces of lumber are cut off to desired lengths after the glue has been set and the lumber emerges from the outfeed endless bed means, is shown in Figs. 2, 4 and 27 to 33, inclusive. This flying saw means comprises longitudinally extending horizontal frame members 400 supported by upright leg members 401. The horizontal frame members 400 are positioned in end to end alignment with the side frame members 80 which carry the end press and glue setting means and are preferably secured thereto. Cross frame members 402 connect the longitudinal frame members 400.

A longitudinally extending multiple piece track 403 is supported on the top of each side frame member 400. A rail 404 of a saw carriage frame 405 is slidable for longitudinal movement by each track 403. The saw carriage is thus mounted for longitudinal movement on the fixed frame 400, 401, 402, and it carries the saw mechanism.

Two sets of relatively telescopic plates 406 and 407, Figs. 27 and 28, are connected with the respective end portions of the saw carriage 405 and serve as extensible and contractable table top means. Fragments only of the plates 406 and 407 are shown in Fig. 27.

Two upright brackets 408 are fixedly secured to opposite sides of the carriage 405 and extend upwardly therefrom. A cross shaft 409 is supported for oscillation by the brackets 408. Two lever arms 410 are keyed or otherwise fixed secured to opposite end portions of the cross shaft 409 and extend toward the end press. Two upright saw carrying arms 411 are connected by pivot pins 412 with the end portions of the lever arms 410 remote from the shaft 409. The lower end portions of the upright saw carrying arms 411 are connected by pivot members 413, see dotted lines Fig. 28, with the forward end portions of horizontal links 414. The rear end portions of the horizontal links 414 are connected by pivot members 415 with the brackets 408. The levers 410 and links 414 are parallel and of equal length and this provides stable and efficient supporting means for the saw carrying arms 411 and insures that these arms will always be held in an upright position and will not be tilted when they are moved up and down. This provides for vertically moving a saw 416 which is carried by the arms 411 without tilting said saw.

The saw 416 is mounted directly on the shaft of a motor 417. The motor 417 is secured to a bracket 418. The bracket 418, see Fig. 29, has flanges 419 which are slidable in trackways 420 of a frame 421. The frame 421 is rigidly secured to flanges 422 on the upper end portions of the saw carrying arms 411. The frame 421 with trackways 422 extends crosswise above the flying saw frame, see Figs. 27, 30 and 31.

A pneumatic saw stroke cylinder 423 is fixedly secured to and supported by the frame 421. A piston 424 in cylinder 423 is connected by a piston rod 425 with the bracket 418 to which the motor 417 is secured. This provides pneumatic moving means for moving the saw back and forth across the path of the moving lumber strips. Provision is made, as hereinafter explained, so that the saw 416 will cut as it moves in one direction across the path of the traveling lumber strips and will be raised clear of the lumber strips as it moves in the other direction. Preferably a transversely extending strip of wood 426 is inset into the flat table top part of the saw carriage 405 and a groove 427 is provided in this strip 426 to receive the lower peripheral portion of the saw.

Saw control devices are connected with the shaft 409 to hold the saw 416 down when it is being moved in one direction in making a cut and to lift said saw when it is being retracted or moved in the opposite direction. These saw control devices comprise a lever means keyed or otherwise fixedly secured to the shaft 409 and providing two lever arms 430 and 431. A pneumatic cylinder 432 has a piston 433 and a piston rod 434 which is adapted to exert a pressure against an adjustable bolt 435 of lever arm 430 to hold the saw down while it is making a cutting stroke. A compression spring 436 is provided on a rod 437 between a collar 438 on said rod and a fixed frame bracket 439. The upper end of the rod 437 is pivotally connected with the lever arm 431 and the spring 436 lifts the saw 416 and holds it up clear of the lumber in the absence of pressure in the cylinder 432. Pneumatic pressure is supplied to cylinder 432 while the saw 416 is being moved in one direction, such as from left to right as respects Fig. 30, across the carriage 405 to make a cutting stroke and pressure in this cylinder 432 is relieved so that the spring 436 will lift the saw 416 while said saw is being moved in the opposite direction. It is to be noted that the saw is shown in a lowered or cutting position in Figs. 4, 28 and 31.

In order that the saw 416 may be used to cut moving pieces of lumber it is necessary for the carriage 405 to be moved with the lumber and at the same speed as the lumber while the saw is making a cut and to then be returned to a starting position. The means herein disclosed for thus reciprocably moving the carriage comprises an endless traveling link belt 441 carried on two sprocket wheels 442 and 443, Fig. 27. The sprocket wheels 442 and 443 are respectively keyed or otherwise fixedly secured to two transverse shafts 445 and 446 which are rotatively mounted adjacent the discharge end and the head end of the flying saw respectively.

The shaft 446, Figs. 22, 23 and 27, has a driving connection with the shafts 137a and 137b of the lower outfeed endless beds C in both lines of production. The driving means from the shaft 137a, Fig. 22, to shaft 446 comprises two sprocket wheels 471 and 472 on the respective shafts 446 and 137a connected by a link belt 473. The driving means from the shaft 446 comprises two sprocket wheels 474 and 469 on the respective shafts 446 and 137b connected with each other by a link belt 468. In the event one of the link belts 473 or 468 moves faster than the other then the over running clutches 470 function to transmit the drive to the shaft 446 from the fastest moving link belt. This unequal speed condition will occur if there is a slippage between the lower outfeed endless bed and the lumber strip in one line of production. It is to be borne in mind that the lumber strips are moved by, and take their speed from, the infeed endless beds A, and that the outfeed endless beds C exert a constant back pressure on these lumber strips. Consequently, if slippage occurs in the outfeed endless beds in one line of production the slipping beds will be moving slower than the lumber strips.

The danger of simultaneous slippage on the lumber strip of the outfeed endless beds in both lines of production is negligible. The over running clutches make sure that the flying saw will always be longitudinally moved at the same speed as the faster moving outfeed endless bed, which is the same speed as the lumber strip. This obviates damage to the flying saw which would occur if it encountered and cut into a lumber strip while moving at a different lineal speed than the lumber strip.

A plurality of rolls 447 are secured on the shaft 445 to facilitate the discharge of the cut off lumber from the flying saw. The lumber passes from the telescopic plates 406 onto these rolls 447.

The carriage 405 has link belt engaging means which is adapted to be selectively engaged with the two laps of the endless traveling link belt 441 to move the carriage 405 back and forth. This carriage moving means, Figs. 28 and 31, includes an upper jaw part 448 of inverted channel shape secured to the carriage 405 and positioned to receive the upper lap of the link belt 441. Also it includes a lower channel shaped jaw part 449 secured to the carriage 405 and positioned to receive the lower lap of the link belt 441. A vertically movable clamp member 450 having two jaw parts 451 and 452 is positioned between the two jaw parts 448 and 449. Each jaw part 448, 449, 451 and 452 has a link belt engaging pad 453 of friction material secured to the part thereof which is adapted to contact the link belt 441. The vertically movable clamp member 450 is movably supported by a lever arm 454 and a link 455 which keep the clamp member 450 at right angles to the link belt 441. The lever arm 454 is keyed or otherwise fixedly secured to a shaft 456 which is journaled in brackets 457, Fig. 28. The brackets 457 are rigid with the carriage 405.

Another lever arm 458, Fig. 28, is rigidly secured to the shaft 456 and extends downwardly therefrom and has its lower end portion connected with a piston rod 459. Two aligned cylinders 460 and 461 receive the respective end portions of the piston rod 459 and said rod 459 has a piston 462 secured thereon within each cylinder 460 and 461. A compression spring 463 engages with each piston and the two opposed springs 463 cooperate to hold the link belt clamping members disengaged from the link belt 441 in the absence of fluid pressure in the cylinders 460 and 461. If fluid under pressure is admitted to the cylinder 460 through conduit 464 the clamping member 450 will be moved upwardly and will clamp the upper lap of the link belt 441 and the carriage 405 will be moved to the left as respects the showing in Fig. 28. If fluid under pressure is admitted to the other cylinder 461 through a conduit 465 then clamping member 450 will be moved downwardly and jaws 452 and 449 will clamp the lower lap of the link belt 441. This will cause the carriage 405 and parts carried thereby to be moved to the right as respects the showing in Fig. 28. As soon as fluid pressure in either cylinder 460 or 461, to which it has been admitted, is relieved then the springs 463 will return the jaw parts to a disengaged position as shown in Figs. 28 and 31.

The link belt 441 is moving at the same speed as the lumber strip 39 and synchronizes the movement of the flying saw with the lumber strip 39. However, to relieve the clamps and link belt 441 of some of the load of moving the flying saw, a pneumatic means has been provided to help move said flying saw. This pneumatic means comprises a booster cylinder 529 secured to the flying saw frame 400–401 having therein a piston 544 connected with a piston rod 545. The outer end of the piston rod 545 is connected as by bracket and pin means 546, Fig. 31, with the carriage 405. The operation of this booster cylinder is more fully hereinafter described in connection with the hydraulic control means shown in Fig. 33.

The booster cylinder 529 functions to insure the accurate positioning of the flying saw to a predetermined point in its cycle, i.e., its commencing point. Thus, assurance of any loss motion in the clamping members 450 in gripping the link belt 441 will be avoided.

When random length pieces of lumber are end spliced as shown in Figs. 10, 14 and 18 and pass as continuous strips to a saw by which they are cut into predetermined lengths, it is desirable to avoid sawing through the joined or spliced ends of the strips. The present machine embodies means which enables an operator who is supplying random length pieces or units of lumber onto the feed table at the intake end of the machine to feed these units of lumber in such a manner as to obviate cutting through joined ends of the units by the flying cut-off saw.

With this end in view the signal lamps 75 are provided in the transparent housing 76 on the feed table and these lamps are connected with circuit closing means operated by the cut-off saw mechanism. This circuit closing mechanism is shown in Figs. 28 and 30. It includes a fixed dial 475 of insulating material supported by a bearing post 476 and having a plurality of contact members 477 over which a contactor 478 is movable. The bearing post 476 is supported from the frame 400–401 of the flying saw. A rotating member comprising a gear wheel 480 carrying two cam wheels 505 and 506 is rotatively mounted on the bearing post 476. The cam wheel 505 carries contactor 478. The gear wheel 480 meshes with a pinion 481 on a shaft 482. The shaft 482 is supported in bearings 483 and has two sprocket wheels 484 and 485 of different size rotatively mounted thereon. Each sprocket wheel has, on its hub portion, a clutch jaw 486 which is adapted to be engaged by a sliding clutch member 487 which is splined on the shaft 482. Clutch member 487 may be set in a neutral or disengaged position or it may be selectively moved into engagement with either sprocket wheel 484 or 485.

Two link belts 488 and 489 connect the respective sprocket wheels 484 and 485 with two other sprocket wheels 490 and 491 on the shaft 445.

Preferably brake means is provided in connection with the shaft 446 to stop longitudinal movement of the flying saw in the event movement of the lumber through the machine stops. This brake illustrated in Figs. 27 and 28 comprises a drum 492 on the shaft 446 having brake shoes 493 applicable thereto. A solenoid 494 operates through lever arm 495 and controls the application of shoes 493 to drum 492. The energizing of the solenoid 494 is controlled in such a manner as to bring about the setting of the brake in the event movement of the lumber stops.

As hereinbefore pointed out the driving means for the feed table and the endless infeed and outfeed beds of the end press and the link belt 441 of the cut-off saw are all synchronized and the contactor means 478 is synchronized with these parts through the mechanism just described. When the unit including cam wheels 505 and 506 is driven by means of the two sprocket wheels 490 and 484 the contactor 478 which is carried thereby will make one complete revolution while the lumber is traveling a predetermined number of feet such, for instance, as twenty feet. When said unit including cam wheels 505 and 506 is driven through the other two sprocket wheels 491 and 485, the contactor 478 will be moved at a slower speed and will make one revolution while the lumber is traveling a greater number of feet, such for instance, as twenty-four feet.

Obviously the driving means between the shafts 445 and 482 may be varied so as to provide any desired number of speed ratios between these two shafts, the drive for all speeds being positive and slippage between the two shafts being avoided. A positive infinitely variable speed driving means 563 which will accomplish this purpose is somewhat diagrammatically shown in Figs. 34 and 35. This driving means 563 is illustrated as being interposed between shafts 445 and 482 just hereinbefore described.

This driving means comprises two pairs of relatively adjustable radially grooved conical wheels 564 and 565, Fig. 35, operatively connected by a laterally toothed endless pitching chain 566, all disposed within a housing 563. The two pairs of radially grooved conical wheels are interconnected for adjustment by lever yokes 567 and 568 mounted on pivots 569. Yokes 567 and 568 are adjustable as by a right and left hand screw 570 having a handwheel 562. A link belt 562, Fig. 34, connects the shaft 445 with a sprocket wheel 560 on the power input shaft 572 of the two conical toothed wheels 564. Another link belt 573 on the power output shaft 574 of the two conical toothed wheels 565 connects a sprocket wheel 561 on said shaft 574 with the previously described shaft 482 from which the cam wheels 505 and 506 are driven. This provides positive infinitely variable speed drive means between shafts 445 and 482 and makes it possible to cut equal length boards of any desired length between predetermined maximum and minimum limits.

Movement of the contactor 478, Figs. 27 and 33, over the dial 475 is synchronized with the movement of the flying saw and with the movement of the lumber strips 39. As the contactor moves over the contact buttons 477 on the dial 475, it will momentarily and successively energize the lamps 75 on the feed table. This will provide in effect a moving signal light on the feed table and this light will move from the outer toward the inner end of said table. This moving light will indicate to the operator who is making up the lumber strips on the feed table the position on lumber strip assembly where they will be cut by the flying saw when they reach the same. This enables the operator, in feeding random length lumber pieces or units to avoid matching or arranging these pieces so that they will be cut at or too near the joints by the flying saw.

Pneumatic control means for the flying saw is diagrammatically shown in Fig. 33, and some of the valves for the same are shown on Figs. 28 and 31. This control means is actuated by cams 534 and 535 on the respective cam wheels 506 and 505, see also Fig. 28. Cam 535 controls forward movement of the flying saw, that is, movement of the flying saw in the direction in which the lumber strip is traveling. Cam 534 controls return movement of said flying saw. The flying saw begins its movement from a starting position in which it is shown in Figs. 2 and 4, and is returned to this starting position at the end of each cutting stroke.

The cam 535 on forward cam wheel 505 actuates a bleeder valve 507. This reduces pressure in a conduit 500 and operates a main air line valve 509. The valve 509 is a four-way two position bleeder actuated valve of standard structure. The operation of main air line valve 509 allows compressed air to pass from main air supply conduit 501 through pressure regulator filter and lubricator 543, through conduits 502 and 503, through main air line valve 509, and through conduits 536, 504, 522 and 464 to travel clamp cylinder 460. A pressure operated sequence valve 514 in a conduit 510 delays the passage of compressed air through this conduit 510 and a carriage operated valve 526 in a conduit 522 which is connected between conduits 536 and 504 and a travel booster cylinder 529 is, at this time, closed.

The admission of compressed air to travel clamp cylinder 460 actuates toggle arms 454-458, see also Fig. 28, and clamps the upper lap of the link belt 441 which moves the flying saw carriage. This starts the saw carriage to move forwardly and travel with the lumber. When the saw carriage 405 thus starts to move forwardly it trips the cam actuated air valve 526 and admits compressed air through conduit 522 to the travel booster cylinder 529. This causes the travel booster cylinder assembly to assume some of the load incident to moving the saw carriage 405 but the moving link belt 441 will govern and synchronize the speed of movement of said saw carriage with the passage of the lumber.

At about the time the saw carriage 405 starts to move, the compressed air will have opened and passed through the sequence valve 514 and will have passed through a then open valve 520, see also Fig. 31, and entered the saw lowering cylinder 432, see also Fig. 28. A pressure operated sequence valve 550 in a conduit 512 which communicates with conduit 510 retards the flow of air through conduit 512 and insures an ample supply of compressed air to saw lowering cylinder 432. The admission of compressed air to saw lowering cylinder 432 lowers the saw carriage and thus lowers the saw 416 into a cutting position and holds the same in this lowered cutting position until the cutting stroke of the saw is completed.

By the time the saw has been lowered into cutting position the momentarily retarded compressed air has passed the sequence valve 550 and has passed through conduit 516, air actuated four-way two position valve 523, conduit 517, air speed regulator 524 and conduit 518 to the saw stroke cylinder 423. This admission of compressed air to saw stroke cylinder 432 moves the lowered saw transversely across the lumber strips 39 and cuts these lumber strips while said saw is being longitudinally moved synchronously with the lumber strips.

At the end of the transverse cutting stroke which is imparted to the saw 416 by the saw cylinder 423, the valve 520 is operated cutting off air supply and exhausting the compressed air from the saw lowering cylinder 432. This permits the spring 436, Fig. 28, to lift the saw above the level of the lumber strips preparatory to the return or retractile movement of said saw. This completes the first half of a cycle in which movement of the saw carriage 405 with the lumber has been started; the travel booster cylinder 529 has been actuated to help move said saw carriage with the lumber; the saw assembly has been lowered and the saw 416 moved across the lumber strips to cut the same and the saw assembly has then been raised to raise the saw 416 clear of the lumber preparatory to the return stroke now to be described.

While the saw carriage is still traveling with the lumber the cam 534, Fig. 28, contacts and operates a bleeder valve 508 and reduces air pressure in a conduit 531. This causes movement of the main air line valve 509 from one position to another and exhausts air pressure by way of conduits 536 and 522 from travel booster cylinder 529. At the same time it exhausts air pressure by way of conduits 536, 504 and 464 from the forward travel clamp cylinder 460 and permits the release of spring actuated clamp member 450 from the upper lap of link belt 441. This stops the forward movement of the saw carriage.

The exhaust of air as set forth in the preceding paragraph is also operative by way of conduits 510, 512 and 516 and causes the air valve 523 to move back to its initial position and this exhausts air from the end of the saw stroke cylinder 423 to which pressure was supplied for the cutting stroke and supplies compressed air by way of a main air line by-pass conduit 513 and a conduit 519 and an air speed regulator 538 to the other end of said saw stroke cylinder 423. This starts the saw assembly including the saw 416 on its return or retractile movement, transversely considered.

When the air valve 509 was moved in response to the actuation of bleeder valve 508, as just previously described, compressed air from conduit 503 was allowed to pass through conduits 537 and 532 and opened valves 530, 527 and a conduit 465 to reverse movement clamp cylinder 461. It is to be noted that an air speed regulator valve 528 in a conduit 533, which connects with conduit 537 momentarily insures a proper supply of compressed air to said cylinder 461. The admission of air to cylinder 461 applies clamp member 450 to the lower lap of link belt 441 and starts the return movement of the saw carriage toward its initial or starting position.

As the carriage, in its return movement, approaches a starting position it first engages with and closes the valve 530, see also Fig. 28, and cuts off the supply of compressed air to the clamp cylinder 461 and exhausting said cylinder, thus releasing clamp member 450 from chain 441. However, the travel booster cylinder continues the return movement of the carriage 405 until the air valve 527, see also Fig. 28, is operated to cut off the supply of air to and provide exhaust for the travel booster cylinder 529, thus stopping the saw carriage in its initial or starting position.

A normally open electrically operated air shut off valve 548 is provided in the main air supply line or conduit 501 and a normally closed electrically operated air exhaust valve 549 is provided in the forward air line 536. These two valves 548 and 549 are connected in the same circuit as the previously explained brake control solenoid shown in Fig. 28. In the event the machine stops, the air valve 548 will shut off the supply of air from the main air line 501 and the emergency exhaust valve 549 will open and exhaust the air from all pneumatic cylinders and lines which are connected with the forward air line 536.

In the forming of boards from the continuous strip, instead of employing a cut off saw, an unglued joint may be used. That is, the operator in partially assembling the units or pieces may insert in the line two pieces having their adjacent ends unglued. Thus, the strip can be forced apart at said unglued joint. Or an unglued block of like proportions cross sectionally considered to the units of the strip can be inserted in the line and thus form an interruption in the continuous strip with glued joints to divide the strip into boards.

The mode of operation of the machine has been set forth in conjunction with the structural description as the two descriptions mutually aid the comprehension of the other.

I claim:

1. The method of forming a continuous longitudinally directed lumber strip from relatively short pieces of lumber the ends of which are end matched and wet glued, comprising the steps in a continuous operation of partially assembling said pieces in longitudinal alignment with unclosed joints at their end portions to form a continuous lumber strip; subjecting said partially assembled pieces to endwise directed compression forces which causes an exuding of the glue; spreading and heating a portion of the exuded glue into a thin film on, and simultaneously removing a portion of said exuded glue from, the surface of the lumber strip; and heating and discharging said removed glue.

2. The method of forming a continuous longitudinally directed lumber strip from relatively short pieces of lumber the ends of which are end matched and wet glued, comprising the steps in a continuous operation of partially assembling said pieces in longitudinal alignment with unclosed joints at their end portions to form a continuous lumber strip; subjecting said partially assembled pieces to endwise directed compression forces which causes an exuding of the glue; ironing the exuded glue into a thin film on the lumber strip around the joint and simultaneously heating and transforming the same into a thin insulating dry glue film and drying the lumber surface; and polymerizing the glue in the joint in a high frequency alternating field whereby the dry glue film prevents arcing and scorching the lumber.

3. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled resilient back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means; and an electric high frequency glue setting means disposed in line of feed after said hot rolls.

4. A continuous strip lumber forming machine for forming boards of commercial length in a continuous operation from prepared relatively short waste units of lumber comprising a conveyor infeed make-up table on which relatively short pieces of end matched lumber with uncured glue applied to said end portions may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means; and an electrical glue setting means disposed in line of feed after said hot rolls.

5. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means, the surface of said rolls contacting said lumber and rotating counter to the direction of movement of said lumber strip whereby said wet exuded glue on the surface of the lumber is spread into a thin film in part pretreated and in part removed by said rollers on which said glue is also dried; electric high frequency glue setting means disposed in line of feed after said hot rolls.

6. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means, the surface of said rolls contacting said lumber and rotating counter to the direction of movement of said lumber strip whereby said wet exuded glue on the surface of the lumber is spread into a thin film in part pretreated and in part removed by said rollers on which said glue is also dried; a glue removing scraper engaging the circumferential portions of each of said hot rolls whereby that portion of the exuded glue adhering and seared upon the rolls is removed in maintaining the rolls clean; electric high frequency glue setting means disposed in line of feed after said hot rolls.

7. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means; and a high frequency glue setting electrode disposed in line of feed after said hot rolls and in spaced relation to the surface of the lumber.

8. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means, a high frequency glue setting electrode disposed in line of feed after said hot rolls and in spaced relation to the surface of the lumber; and a non-conducting strip of lumber hold down shoe resiliently mounted disposed in line of feed adjacent the said electrode whereby upwardly directed buckling of the continuous strip of lumber is prevented.

9. A continuous strip lumber forming machine for forming boards of commercial length in a continuous operation from prepared relatively short waste units of lumber comprising a conveyor infeed make-up table on which relatively short pieces of end matched lumber with wet glue applied to said end portions may be partially assembled into a continuous strip of lumber; driven infeed means; outfeed means exerting a controlled predetermined constant back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means; and a high frequency glue setting electrode disposed in line of feed after said hot rolls and in spaced relation to the surface of the lumber.

10. A continuous strip lumber forming machine for forming boards of commercial length in a continuous operation from prepared relatively short waste units of lumber comprising a conveyor infeed make-up table on which relatively short pieces of end matched lumber with wet glue applied to said end portion may be partially assembled into a continuous strip of lumber; driven infeed means; outfeed means exerting a controlled back pressure on that portion of said lumber strip disposed intermediate the said infeed and outfeed means whereby said assembled lumber units are subjected to end pressure which further holdingly presses the ends together; driven exuded glue pretreating hot rolls disposed in line of feed adjacent said infeed means; a high frequency glue setting electrode comprising two spaced apart parallel electrically connected bars disposed in line of feed after said hot rolls; and a resiliently mounted non-conducting lumber strip hold down shoe disposed between said bars, whereby upwardly directed buckling of the continuous strip of lumber is prevented.

11. A continuous strip lumber forming machine for forming boards of commercial length in a continuous operation from prepared relatively short waste units of lumber comprising a conveyor infeed make-up table on which relatively short pieces of end matched lumber with wet glue applied may be partially assembled into a continuous strip of lumber; a signal means mounted on said make-up table providing a signal adjacent to and movable longitudinally of the table; driven infeed means; outfeed means exerting a controlled back pressure on that portion of said lumber strip disposed intermediate the said infeed and outfeed means whereby said assembled lumber units are subjected to end pressure which further holdingly presses the ends together; glue setting means disposed between said infeed and outfeed means; and a control for said signal means driven by said outfeed means and providing indication by the signal means of the location of the points of transverse cut with respect to the end portion of the advancing lumber strip being assembled, whereby an operator may select a unit of a length which will provide a given point of transverse cut between joints of said strip.

12. A continuous strip lumber forming machine for forming boards of commercial length in a continuous operation from prepared relatively short waste units of lumber comprising a conveyor infeed make-up table on which relatively short pieces of end matched lumber with wet glue applied may be partially assembled into a continuous strip of lumber; a plurality of signal lamps mounted upon and spaced apart longitudinally of said table; driven infeed means; outfeed means exerting a controlled back pressure on that portion of said lumber strip disposed intermediate the said infeed and outfeed means whereby said assembled lumber units are subjected to end pressure which further holdingly presses the ends together; glue setting means disposed between said infeed and outfeed means; and a control for said signal lamps driven by said outfeed means and synchronously indicating by successive illumination of said lamps on said infeed table the locations at which transverse cuts will occur with respect to the advancing rear end portion of the advancing lumber strip being assembled, whereby an operator may select a length of board which will provide that a given transverse cut producing a board of predetermined commercial length occurs between joints of said strip.

13. A plural continuous strip lumber forming machine for forming boards of commercial length in a continuous operation from prepared relatively short waste units of lumber comprising a conveyor infeed make-up table on which relatively short pieces of end matched lumber with wet glue applied may be partially assembled into a continuous strip of lumber; a signal means on said table providing a signal common to and in close proximity with said strips, the said signal being longitudinally movable along said table; driven infeed means; outfeed means exerting a controlled back pressure on that portion of said lumber units disposed intermediate the said infeed and outfeed means whereby said assembled lumber units are subject to end pressure which further holdingly presses the ends together while the glue is setting; glue setting means disposed between said infeed and outfeed means for each of said strips; and a control for said signal means driven by said outfeed means and synchronizingly indicating the location of the points of transverse cut with respect to the rear end portions of the advancing lumber strips, whereby lengths of lumber unit may be fed which will provide the transverse cuts clear of the joints of said strips, and whereby the feeding of said lumber units is facilitated by having two possible places for placing and feeding a unit of lumber of a given length.

14. In a continuous strip lumber forming machine for forming boards of commercial length in a continuous operation from prepared relatively short waste units of lumber comprising an infeed make-up table on which relatively short pieces of end matched lumber may be partially assembled in end to end alignment; driven infeed means; and outfeed means exerting a controlled resilient constant back pressure on that portion of said lumber strip disposed intermediate the said infeed and outfeed means whereby said assembled lumber units are subjected to end pressure which frictionally holdingly presses the ends together.

15. In the method of forming a continuous longitudinally directed lumber strip from relatively short pieces of lumber, the ends of which are end matched and provided with uncured glue, the steps in a continuous operation of forming a continuous lumber strip of said short pieces assembled in longitudinally axial alignment with uncured glue in the joints between the units of lumber; pre-heat treating said glue within the joint; and then curing said glue.

16. In a continuous strip lumber forming machine for forming boards of commercial length in a continuous operation from prepared relatively short random waste units of lumber comprising a conveyor infeed make-up table on which relatively short pieces of end matched lumber with uncured glue applied to said end portions may be partially assembled into a continuous strip of lumber; driven infeed means; driven outfeed means; exuded glue pretreating hot rolls disposed in line of feed adjacent said infeed means comprising heated upper and lower rolls, receiving therebetween the continuous strip of units of lumber being formed, driving means for said rolls causing said rolls to revolve in a direction counter to that of the continuous strip, scraper means spirally disposed with respect to said rolls and of curved form cross sectionally considered forming a glue laterally conducting trough whereby glue adhering to said rolls may be removed from the machine in maintaining same clean for continuous operation.

17. In a lumber forming machine for forming a lumber product from relatively short random length units of lumber comprising a driven infeed means advancing a partially assembled strip of relatively short varying length pieces of lumber aligned axially in said strip; and an overdriven outfeed means exerting a resilient magnetic flux drag generated, constant back pressure on the strip of lumber passing between the infeed and outfeed means.

18. A continuous lumber forming machine for forming boards of commercial length in a continuous operation from pieces of relatively short waste units of lumber, comprising an infeed make-up table on which relatively short pieces of end-matched lumber with wet glue applied to said end portions are partially assembled into a continuous longitudinally extending strip of lumber; endless infeed beds; endless outfeed beds in spaced longitudinally axially aligned position with respect to said endless infeed beds; an electric motor driving said infeed endless beds and having a predetermined adjusted operating driving speed for said motor; second electric motor driving said outfeed endless bed, and having a predetermined operating speed of said second motor slower than that of the motor driving said infeed endless beds when there are no strips of lumber passing simultaneously in continuous strip between the infeed and outfeed beds but of the same speed when said strips of lumber are so passing simultaneously, at which time the outfeed motor is overdriven and develops a controlled, resilient, constant back pressure on the feeding of said lumber strips in overcoming slippage of said lumber strips with respect to said feed beds; and an electric glue setting means disposed in the path of said lumber strips between said feed beds.

19. A continuous strip lumber forming machine for forming boards from pieces of relatively short waste units of lumber comprising an infeed make-up table on which relatively short pieces of end-matched lumber may be partially assembled into a continuous longitudinally extending strip of lumber; an infeed means disposed longitudinally adjacent to said infeed make-up table forcing said short pieces of end-matched lumber longitudinally of said infeed means; an electric motor for driving said infeed means; an outfeed means longitudinally and axially aligned with respect to said endless infeed beds; a second electric motor for driving said outfeed means, which second motor is operative when unloaded at a given speed which is less than that of the motor for the driving infeed means when the latter motor is operating in unloaded condition, in providing that said second motor generates, by magnetic flux drag, a constant degree of back pressure upon the strips of lumber moving between said infeed and outfeed means.

20. A continuous strip lumber forming machine for forming boards from pieces of relatively short waste units of lumber comprising an infeed make-up table on which relatively short pieces of end-matched lumber may be partially assembled into a continuous longitudinally extending strip of lumber; an infeed means disposed longitudinally adjacent to said infeed make-up table forcing said short pieces of end-matched lumber longitudinally of said infeed means; an electric motor for driving said infeed means; an outfeed means longitudinally and axially aligned with respect to said infeed means; a second electric motor for driving said outfeed means, said infeed and outfeed means being respectively driven by said motors at respectively faster and slower speeds when not loaded, whereby a constant back pressure independent of frictional factors is developed upon said continuous strip of lumber being moved therebetween due to the magnetic flux drag generated in said second motor when the latter is overdriven by said outfeed means.

21. In a lumber forming machine for forming a lumber product from relatively short random length units of lumber comprising an electric motor driven infeed means to which is fed relatively short pieces of lumber with glue applied to their end portions; an electric motor driven outfeed means, the latter motor being characterized by having normal unloaded operating speed less than that of the motor of the infeed means in providing a back pressure on the strip of lumber passing between the infeed and outfeed means, said back pressure being characterized by being constant and independent of frictional engagement with the units of lumber as it is developed by the magnetic flux drag produced when the outfeed motor operates as a generator incident to the lumber passing therebeneath at the same speed as that of the loaded electric motor driven infeed means; and a glue curing means disposed between the said infeed and outfeed means in setting the glue rapidly while the end portions are under constant pressure.

22. The method of forming a continuous longitudinally directed ribbon-like strip of relatively short and varying length pieces of lumber into boards of commercially desired length comprising the steps in a continuous operation of partially assembling relatively short varying length pieces of lumber having matched ends of interlocking fingers in end to end relation in a predetermined order in a moving longitudinally axially aligned strip, said pieces being selected for assembling as to their length in conformance to a signal moving with and in a path parallel to that of said pieces, said signal indicating the line of cutting where the strips when completely formed will be cut and thus controlling the selection of the length of piece in the act of assembling which brings the sawing in desired spaced relation to the joint of the pieces of lumber; completing forming said partially assembled pieces of lumber into a unitary strip of lumber; and sawing said strip into commercially desired lengths at points between the joints thereof.

23. The method of forming a continuous longitudinally directed ribbon-like strip of relatively short and varying length pieces of lumber into boards of commercially desired length comprising the steps in a continuous operation of partially assembling relatively short varying length pieces of lumber having matched ends of interlocking fingers provided with wet glue in end to end relation in a predetermined order in a moving longitudinally axially aligned strip, said pieces being selected for assembling as to their length in conformance to a signal moving with and in a path parallel to that of said pieces, said signal indicating the line of cutting where the strip when completely formed will be cut and thus controlling the selection of the length of piece in the act of assembling which brings the sawing in desired spaced relation to the joint of the pieces of lumber; completing forming said partially assembled pieces of lumber into a unitary strip of lumber; and sawing said strip into commercially desired lengths at points between the joints thereof.

24. The method of forming a continuous longitudinally directed ribbon-like strip of relatively short and varying length pieces of lumber into boards of commercially desired length comprising the steps in a continuous operation of partially assembling relatively short varying length pieces of lumber having matched ends of interlocking fingers provided with wet glue in end to end relation in a predetermined order in a moving longitudinally axially aligned strip, said pieces being selected for assembling as to their length in conformance to a signal moving with and in a path parallel to that of said pieces, said signal indicating the line of cutting where the strip when completely formed will be cut and thus controlling the selection of the length of piece in the act of assembling which brings the sawing in desired spaced relation to the joint of the pieces of lumber; completely forming said partially assembled pieces of lumber into a unitary strip of lumber by subjecting said strip to an electrically controlled constant backwardly directly resilient compression force developed as a strain in a magnetic flux and of a constancy character as to magnitude which does not disturb the setting of said glue in providing a strength of strip which can be subjected to sawing as the strip is relieved of said compression force, and sawing said strip into commercially desired lengths at points between the joints thereof, thereby conserving and utilizing the maximum value of the lumber pieces in the strip.

25. In a continuous strip lumber forming machine for forming boards of commercial length in a continuous operation from prepared relatively short random length waste units of lumber comprising a conveyer make-up table on which relatively short pieces of end matched lumber with uncured glue applied to said ends are partially assembled into a continuous strip of lumber extending in axial longitudinal alignment; driven infeed means; driven outfeed means developing a back pressure on the strip of boards in completing the assembling thereof during which exuded glue arises between the joints; exuded glue pretreating hot rolls disposed in the line of feed adjacent to said infeed means comprising heated upper and lower rolls receiving therebetween the continuous strip of units of lumber being formed; driving means for said rolls causing said rolls to revolve in a direction counter to that of the continuous strip; and scraper means operatively disposed in scraping relation with respect to glue adhering to said rolls in removing the glue in maintaining the said rolls clean.

26. In a continuous strip lumber forming machine for forming boards of commercial length in a continuous operation from prepared relatively short random length waste units of lumber comprising a conveyor make-up table on which relatively short pieces of end matched lumber with uncured glue applied to said ends may be partially assembled into a continuous strip of lumber extending in axial longitudinal alignment; driven infeed means; driven outfeed means developing a back pressure on the strip of boards in completing the assembling thereof during which exuded glue arises between the joints; exuded glue pretreating hot rolls disposed in the line of feed adjacent to said infeed means comprising heated upper and lower rolls having air cooled bearings and receiving between said rolls the continuous strip of units of lumber being formed; driving means for said rolls causing said rolls to revolve in a direction counter to that of the continuous strip; and scraper means operatively disposed in scraping relation with respect to glue adhering to said rolls in removing the glue in maintaining the said rolls clean.

27. In a continuous strip lumber forming machine for forming boards of commercial length in a continuous operation from prepared relatively short random lengths waste units of lumber comprising a conveyer make-up table on which relatively short pieces of end matched lumber with uncured glue applied to said end portions may be partially assembeld into a continuous strip extending in axial longitudinal alignment; driven infeed means; driven outfeed means which develops a back pressure on the strip of board in completing the assembling thereof during which exuded gule arises between the joints; exuded glue pretreating hot rolls disposed in line of feed adjacent said infeed means comprising heated upper and lower rolls receiving therebetween the continuous strip of units of lumber being formed; driving means of said rolls causing said rolls to revolve in a direction counter to that of the continuous strip; scraper means operatively disposed with respect to said rolls in scraping relation to the glue adhering to said rolls in removing the glue in maintaining the said rolls clean; and an adjustable spring pressed scraper supporting shifter means for passing continuous lumber strips of different widths through the machine.

References Cited in the file of this patent
UNITED STATES PATENTS

| | | |
|---|---|---|
| 794,874 | Mayhew | July 18, 1905 |
| 915,504 | Sutter | Mar. 16, 1909 |
| 921,618 | Murdoch | May 11, 1909 |
| 1,702,185 | Weber | Feb. 12, 1929 |
| 1,804,764 | Grant | May 12, 1931 |
| 1,959,667 | Grant | May 22, 1934 |
| 2,035,650 | Gustafson | Mar. 31, 1936 |
| 2,054,116 | Abrams et al. | Sept. 15, 1936 |
| 2,290,762 | Miller | July 21, 1942 |
| 2,300,728 | Goss | Nov. 3, 1942 |
| 2,370,932 | Bolling | Mar. 6, 1945 |
| 2,373,376 | Bolling | Apr. 10, 1945 |
| 2,408,064 | Hall | Sept. 24, 1946 |
| 2,503,551 | Gustin | Apr. 11, 1950 |
| 2,526,342 | Frisch | Oct. 17, 1950 |
| 2,571,604 | Payzant | Oct. 16, 1951 |
| 2,617,456 | Winkel | Nov. 11, 1952 |
| 2,620,837 | Quick | Dec. 9, 1952 |
| 2,644,496 | Schubert | July 7, 1953 |

FOREIGN PATENTS

| | | |
|---|---|---|
| 599,188 | Germany | June 27, 1934 |
| 270,906 | Switzerland | Dec. 16, 1950 |